US008122983B2

(12) United States Patent
Katsuta et al.

(10) Patent No.: US 8,122,983 B2
(45) Date of Patent: Feb. 28, 2012

(54) POWER OUTPUT APPARATUS, HYBRID VEHICLE WITH THE SAME, AND METHOD FOR CONTROLLING POWER OUTPUT APPARATUS

(75) Inventors: Hiroshi Katsuta, Toyota (JP); Hidehiro Oba, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 427 days.

(21) Appl. No.: 12/518,691

(22) PCT Filed: Oct. 15, 2007

(86) PCT No.: PCT/JP2007/070044

§ 371 (c)(1), (2), (4) Date: Jun. 11, 2009

(87) PCT Pub. No.: WO2008/072417

PCT Pub. Date: Jun. 19, 2008

(65) Prior Publication Data

US 2010/0012405 A1 Jan. 21, 2010

(30) Foreign Application Priority Data

Dec. 12, 2006 (JP) ................................ 2006-334526

(51) Int. Cl.

| | |
|---|---|
| ***B60K 6/44*** | (2007.10) |
| ***B60K 6/442*** | (2007.10) |
| ***B60W 20/00*** | (2007.10) |
| ***B60W 10/04*** | (2006.01) |

(52) U.S. Cl. .......... 180/65.225; 180/65.23; 180/65.265; 180/65.28; 180/65.285

(58) Field of Classification Search .............. 180/65.21, 180/65.22, 65.225, 65.23, 65.245, 65.25, 180/65.26, 65.265, 65.28, 65.285

See application file for complete search history.

(56) References Cited

U.S. PATENT DOCUMENTS

| | | | | |
|---|---|---|---|---|
| 6,666,787 | B2 | 12/2003 | Doepke | |
| 6,837,215 | B2 * | 1/2005 | Nishigaki et al. | 123/352 |
| 7,448,981 | B2 * | 11/2008 | Mashiki | 477/3 |
| 7,559,871 | B2 * | 7/2009 | Amano et al. | 477/3 |
| 7,658,248 | B2 * | 2/2010 | Kaya et al. | 180/65.265 |
| 7,908,063 | B2 * | 3/2011 | Sah | 701/51 |

FOREIGN PATENT DOCUMENTS

| | | |
|---|---|---|
| JP | 2003-106389 A | 4/2003 |
| JP | 2005-008005 A | 1/2005 |
| JP | 2005-081928 A | 3/2005 |
| JP | 2005-125876 A | 5/2005 |
| JP | 2005-155891 A | 6/2005 |
| JP | 2006-063820 A | 3/2006 |

* cited by examiner

*Primary Examiner* — John R Olszewski

(74) *Attorney, Agent, or Firm* — Kenyon & Kenyon LLP

(57) ABSTRACT

There is provided a hybrid vehicle which stops an engine in a state in which a drive source element connection by a clutch is released; a transmission is used to couple only one of the motors to a drive shaft; and one of the motors is caused to output power; at this time, in order to start the engine, a rotation speed of the other one of the motors which does not correspond to a current speed ratio and is not connected to the drive shaft is adjusted so as to enable the drive source element connection; and the clutch is connected as well as the engine is cranked by one of the motors.

10 Claims, 14 Drawing Sheets

ENGINE ECU
BATTERY ECU
MOTOR ECU
BATTERY
CPU
ROM
RAM
IG
VEHICLE SPEED SENSOR
ENGINE
MG2
MG1
ACTUATOR

20
IG
VEHICLE SPEED SENSOR
CPU
ROM
RAM
MOTOR ECU
BATTERY ECU
BATTERY
ENGINE ECU
ENGINE
ACTUATOR
MG1
MG2
C0
C1
C2
80
81
82
83
84
85
86
87
70
72
74
76
30
31
32
33
34
35
36
37
39
22
24
26
28
40
41
41a
42
42a
43
44
45
45a
46
50
51
52
53
54
55
60
61a
61b
62a
62b
63a
63b
64a
64b
65
66a
66b
67
68
69a
69b
88

POWER OUTPUT APPARATUS, HYBRID VEHICLE WITH THE SAME, AND METHOD FOR CONTROLLING POWER OUTPUT APPARATUS

This is a 371 national phase application of PCT/JP2007/070044 filed 15 Oct. 2007, claiming priority to Japanese Patent Application No. JP 2006-334526 filed 12 Dec. 2006, the contents of which are incorporated herein by reference.

TECHNICAL FIELD

The present invention relates to a power output apparatus for outputting power to a drive shaft, a hybrid vehicle with the same and method for controlling power output apparatus.

BACKGROUND ART

Conventionally, as such a power output apparatus, there has been known a power output apparatus including an internal combustion engine, two motors, a so-called ravigneaux planetary gear mechanism, a parallel shaft-type transmission capable of selectively coupling two output elements of the planetary gear mechanism to an output shaft (for example, see Patent Document 1). This power output apparatus is adapted for a front-wheel-drive vehicle, and this power output apparatus is configured such that the internal combustion engine is arranged transversely, and the rotating shafts of the internal combustion engine and the planetary gear mechanism, the two motors and the parallel shaft-type transmission extend in parallel to each other. In addition, conventionally, there has been known a power output apparatus including a planetary gear device having an input element connected to an internal combustion engine and two output elements; and a parallel shaft-type transmission having a countershaft connected to a corresponding output element of the planetary gear mechanism (for example, see Patent Document 2). According to this power output apparatus, each of the two output elements of the planetary gear device is fixed to an inner periphery of a corresponding rotor in an electric drive section.

Patent Document 1: Japanese Patent Laid-Open No. 2005-155891

Patent Document 2: Japanese Patent Laid-Open No. 2003-106389

DISCLOSURE OF THE INVENTION

The power output apparatus disclosed in each of the above Patent Documents is capable of stopping the internal combustion engine as well as transmitting power output from any one of the motors to the output shaft with change in speed thereof by the transmission. However, the above individual Patent Documents do not disclose in detail how to perform such a motor drive for outputting power only by the motor.

In view of this, an object of the present invention is to start the internal combustion engine while properly outputting demanded power to the drive shaft when the power output from the motor is transmitted to the drive shaft with change in speed thereof by the speed change-transmission assembly. In addition, an object of the present invention is to provide a power output apparatus, a hybrid vehicle with the same, and a method for controlling the power output apparatus capable of efficiently transmitting demanded power to the drive shaft such that the speed change-transmission assembly changes the speed of the power output from the motor in a plurality of operation modes.

In order to achieve at least part of the above objects, the power output apparatus and the hybrid vehicle in accordance with the present invention adopt the following measures.

The present invention is directed to a power output apparatus for outputting power to a drive shaft. The power output apparatus includes: an internal combustion engine; a first motor capable of inputting and outputting power; a second motor capable of inputting and outputting power; an accumulator capable of supplying and receiving power to and from each of the first and second motors; a power distribution and integration mechanism having a first element connected to a rotating shaft of the first motor, a second element connected to a rotating shaft of the second motor, and a third element connected to an engine shaft of the internal combustion engine, the power distribution and integration mechanism being configured so that these three elements can be differentially rotated with respect to each other; a connection/disconnection device capable of performing a drive source element connection and a release of the drive source element connection which is one of a connection between the first motor and the first element, a connection between the second motor and the second element, and a connection between the internal combustion engine and the third element; a speed change-transmission assembly capable of selectively coupling one of or both of the rotating shaft of the first motor and the rotating shaft of the second motor to the drive shaft, the speed change-transmission assembly being capable of transmitting power from the first motor and power from the second motor to the drive shaft at predetermined respective speed ratios; a power demand setting device for setting power demand which is power required for the drive shaft; and a control device for controlling the first motor, the second motor, and the connection/disconnection device so that power based on the set power demand is output to the drive shaft, the control device, when an engine start condition for starting the internal combustion engine is satisfied in a state in which the drive source element connection is released, the internal combustion engine is stopped, only one of the first and second motors is coupled to the drive shaft by the speed change-transmission assembly, and the one of the first and second motors outputs power, controlling the first motor, the second motor, and the connection/disconnection device with a rotation speed adjusting process of adjusting a rotation speed of the other of the first and second motors so as to enable the drive source element connection, the drive source element connection, and an engine start process of cranking the internal combustion engine by the first or second motor.

Like this power output apparatus, in a state in which the drive source element connection is released, when the internal combustion engine is stopped, and only one of the first and second motors is coupled to the drive shaft by the speed change-transmission assembly, as well as one of the first and second motors is caused to output power, while the power based on the set power demand is being output to the drive shaft, the drive source element connection can be executed by executing the above rotation speed adjustment process; and when the drive source element connection is executed, the internal combustion engine can be started by causing one of the first and second motors to crank the internal combustion engine while the power based on the set power demand is being output to the drive shaft. As a result, according to this power output apparatus, in a state in which the drive source element connection is released, the internal combustion engine is stopped, and the power output from one of the first and second motors is changed in speed by the speed change-transmission assembly and is transmitted to the drive shaft. At this time, if the engine start condition is established, the internal combustion engine can be started while demanded power is more properly output to the drive shaft.

Alternatively, the rotation speed adjustment process may be a process of matching a rotation speed of the other of the first and second motors which is released from a coupling to the drive shaft, with a rotation speed of the first or second element at the drive source element connection based on a rotation speed of the one of the first and second motors which is coupled to the drive shaft.

Further, the speed change-transmission assembly may be a parallel shaft-type transmission which includes a first transmission mechanism having at least one parallel shaft-type gear train capable of coupling one of the first and second elements of the power distribution and integration mechanism to the drive shaft and a second transmission mechanism having at least one parallel shaft-type gear train capable of coupling the rotating shaft of the first motor or the second motor which corresponds to the other of the first and second elements to the drive shaft. According to such a speed change-transmission assembly which is a parallel shaft-type transmission, one of or both of the rotating shaft of the first motor and the rotating shaft of the second motor can be selectively coupled to the drive shaft.

Alternatively, the speed change-transmission assembly may be a planetary gear transmission which includes: a first transmission planetary gear mechanism having an input element connected to one of the first and second elements of the power distribution and integration mechanism, an output element connected to the drive shaft, and a fixable element, the first transmission planetary gear mechanism being configured so that these three elements can be differentially rotated with respect to each other; a first fixing mechanism capable of non-rotatably fixing the fixable element of the first transmission planetary gear mechanism; a second transmission planetary gear mechanism having an input element connected to the rotating shaft of the first or second motor which corresponds to the other of the first and second elements, and an output element connected to the drive shaft, and a fixable element, the second transmission planetary gear mechanism being configured so that these three elements can be differentially rotated with respect to each other; and a second fixing mechanism capable of non-rotatably fixing the fixable element of the second transmission planetary gear mechanism. According to such a speed change-transmission assembly which is a planetary gear transmission, if one of the first and second fixing mechanisms is placed in a fixed state, one of the rotating shaft of the first motor and the rotating shaft of the second motor can be coupled to the drive shaft. Alternatively, if both of the first fixing mechanism and second fixing mechanism are placed in a fixed state respectively, both of the rotating shaft of the first motor and the rotating shaft of the second motor can be coupled to the drive shaft.

In this case, the speed change-transmission assembly may further include a transmission connection/disconnection mechanism capable of performing a connection and a release of the connection between the output element of one of the first transmission planetary gear mechanism and the second transmission planetary gear mechanism and the fixable element. According to such a speed change-transmission assembly, an output element of the first or second transmission planetary gear mechanism which corresponds to the transmission connection/disconnection mechanism is connected to the fixable element by the transmission connection/disconnection mechanism, as well as a fixable element of the second or first transmission planetary gear mechanism which does not correspond to the transmission connection/disconnection mechanism is non-rotatably fixed. By doing so, both of the rotating shaft of the first motor and the rotating shaft of the second motor can be coupled to the drive shaft. In addition, according to this speed change-transmission assembly, an output element of the first or second transmission planetary gear mechanism which corresponds to the transmission connection/disconnection mechanism is connected to a fixable element, as well as a fixable element of the second or first transmission planetary gear mechanism which does not correspond to the transmission connection/disconnection mechanism is non-rotatably fixed. In this state, if the fixable element of the second or first transmission planetary gear mechanism is made to be rotatable, the individual elements of the first or second transmission planetary gear mechanism corresponding thereto by the transmission connection/disconnection mechanism are substantially locked to rotate integrally. Therefore, the power from one of the rotating shaft of the first motor and the rotating shaft of the second motor can be directly transmitted to the drive shaft.

The present invention is directed to a hybrid vehicle including drive wheels driven by power from a drive shaft. The hybrid vehicle includes: an internal combustion engine; a first motor capable of inputting and outputting power; a second motor capable of inputting and outputting power; an accumulator capable of supplying and receiving power to and from each of the first and second motors; a power distribution and integration mechanism having a first element connected to a rotating shaft of the first motor, a second element connected to a rotating shaft of the second motor, and a third element connected to an engine shaft of the internal combustion engine, the power distribution and integration mechanism being configured so that these three elements can be differentially rotated with respect to each other; a connection/disconnection device capable of performing a drive source element connection and a release of the drive source element connection which is one of a connection between the first motor and the first element, a connection between the second motor and the second element, and a connection between the internal combustion engine and the third element; a speed change-transmission assembly capable of selectively coupling one of or both of the rotating shaft of the first motor and the rotating shaft of the second motor to the drive shaft, the speed change-transmission assembly being capable of transmitting power from the first motor and power from the second motor to the drive shaft at predetermined respective speed ratios; a power demand setting device for setting power demand which is power required for the drive shaft; and a control device for controlling the first motor, the second motor, and the connection/disconnection device, so that power based on the set power demand is output to the drive shaft, the control device, when an engine start condition for starting the internal combustion engine is satisfied in a state in which the drive source element connection is released, the internal combustion engine is stopped, only one of the first and second motors is coupled to the drive shaft by the speed change-transmission assembly, and the one of the first and second motors outputs power, controlling the first motor, the second motor, and the connection/disconnection device with a rotation speed adjusting process of adjusting a rotation speed of the other of the first and second motors so as to enable the drive source element connection, the drive source element connection, and an engine start process of cranking the internal combustion engine by the first or second motor.

According to this hybrid vehicle, in a state in which the drive source element connection is released, when the internal combustion engine is stopped, and only one of the first and second motors is coupled to the drive shaft by the speed change-transmission assembly, as well as one of the first and second motors is caused to output power, if an engine start condition is established, the internal combustion engine can be started while demanded power is more properly output to the drive shaft. Therefore, this hybrid vehicle can well improve fuel consumption and drive performance by appropriately switching a running state in which power from one of the first and second motors is transmitted to the drive shaft and a running state in which power is output to the drive shaft with an operation of the internal combustion engine.

The present invention is directed to another power output apparatus for outputting power to a drive shaft. The power output apparatus includes: an internal combustion engine; a first motor capable of inputting and outputting power; a second motor capable of inputting and outputting power; an accumulator capable of supplying and receiving power to and from each of the first and second motors; a power distribution and integration mechanism having a first element connected to a rotating shaft of the first motor, a second element connected to a rotating shaft of the second motor, and a third element connected to an engine shaft of the internal combustion engine, the power distribution and integration mechanism being configured so that these three elements can be differentially rotated with respect to each other; a connection/disconnection device disposed between the first motor and the first element or between the second motor and the second element, the connection/disconnection device being capable of performing a connection and a release of the connection between the rotating shaft of the first or second motor and the first or second element; and a speed change-transmission assembly capable of selectively coupling the rotating shaft of the first or second motor corresponding to the connection/disconnection device and the first or second element not corresponding to the connection/disconnection device to the drive shaft, the speed change-transmission assembly being capable of transmitting power from a rotating shaft of the first or second motor and power from the first or second element to the drive shaft at predetermined respective speed ratios.

According to this power output apparatus, when the connection between a rotating shaft of the first or second motor and the first or second element is released by the connection/disconnection device, the connection between the first motor and the second motor through the power distribution and integration mechanism is released. Therefore, in a state in which the connection by the connection/disconnection device is released and the internal combustion engine is stopped, the speed change-transmission assembly is used to couple, to the drive shaft, one of the rotating shaft of the first or second motor corresponding to the connection/disconnection device and the first or second element not corresponding to the connection/disconnection device, as well as the power from one of the first and second motors is transmitted to the drive shaft. By doing so, the internal combustion engine and the other one of the first and second motors can be prevented from corotating, while the power from one of the first and second motors can be changed in speed by the speed change-transmission assembly, and demanded power can be efficiently transmitted to the drive shaft. Alternatively, in a state in which the connection by the connection/disconnection device is released and the internal combustion engine is stopped, the speed change-transmission assembly is used to couple, to the drive shaft, both of the rotating shaft of the first or second motor corresponding to the connection/disconnection device and the first or second element not corresponding to the connection/disconnection device. By doing so, the internal combustion engine can be prevented from corotating, and the power output from at least one of the first and the second motors can be transmitted to the drive shaft at a predetermined fixed speed ratio. Therefore, larger power can be output to the drive shaft in comparison with the case in which only one of the first and the second motors is caused to output power. Further, according to this power output apparatus, the connection by the connection/disconnection device can be maintained, while the power from one of the first and the second motors can be transmitted to the drive shaft by causing the speed change-transmission assembly to change the speed thereof. Thereby, according to this power output apparatus, in a plurality of drive modes, the power output from at least one of the first and the second motors can be changed in speed by the speed change-transmission assembly, and the demanded power can be efficiently transmitted to the drive shaft.

The present invention is directed to a method of controlling a power output apparatus including a drive shaft; an internal combustion engine; a first motor and a second motor capable of inputting and outputting power respectively; an accumulator capable of supplying and receiving power to and from each of the first and second motors; a power distribution and integration mechanism having a first element connected to a rotating shaft of the first motor, a second element connected to a rotating shaft of the second motor, and a third element connected to an engine shaft of the internal combustion engine and configured so that these three elements can be differentially rotated with respect to each other; a connection/disconnection device capable of performing a drive source element connection and a release of the drive source element connection which is one of a connection between the first motor and the first element, a connection between the second motor and the second element, and a connection between the internal combustion engine and the third element; a speed change-transmission assembly capable of selectively coupling one of or both of the rotating shaft of the first motor and the rotating shaft of the second motor to the drive shaft, the speed change-transmission assembly being capable of transmitting power from the first motor and power from the second motor to the drive shaft at predetermined respective speed ratios. The method of controlling the power output apparatus includes: (a) adjusting, when an engine start condition for starting the internal combustion engine is satisfied in a state in which the drive source element connection is released, the internal combustion engine is stopped, only one of the first and second motors is coupled to the drive shaft by the speed change-transmission assembly, and the one of the first and second motors outputs power, a rotation speed of the other of the first and second motors so as to enable the drive source element connection; (b) performing the drive source element connection; and (c) starting the internal combustion engine with cranking by the first or second motor.

Like this method, in a state in which the drive source element connection is released, the internal combustion engine is stopped, and only one of the first and second motors is coupled to the drive shaft by the speed change-transmission assembly, as well as one of the first and second motors is caused to output power. At this time, the drive source element connection can be executed by executing the above rotation speed adjustment process. When the drive source element connection is executed, the internal combustion engine can be started by causing one of the first and second motors to crank the internal combustion engine.

Alternatively, in the method of controlling the power output apparatus according to the present invention, torque commands to the first and second motors may be set so that power based on a power demand required for the drive shaft is output during the execution of steps (a) to (c).

Further, the step (a) may match a rotation speed of the other of the first and second motors which is released from a coupling to the drive shaft, with a rotation speed of the first or second element at the drive source element connection based on a rotation speed of one of the first and second motors which is coupled to the drive shaft.

BEST MODE FOR CARRYING OUT THE INVENTION

Hereinafter, the best mode for carrying out the invention will be described with reference to embodiments.

Figure 1:
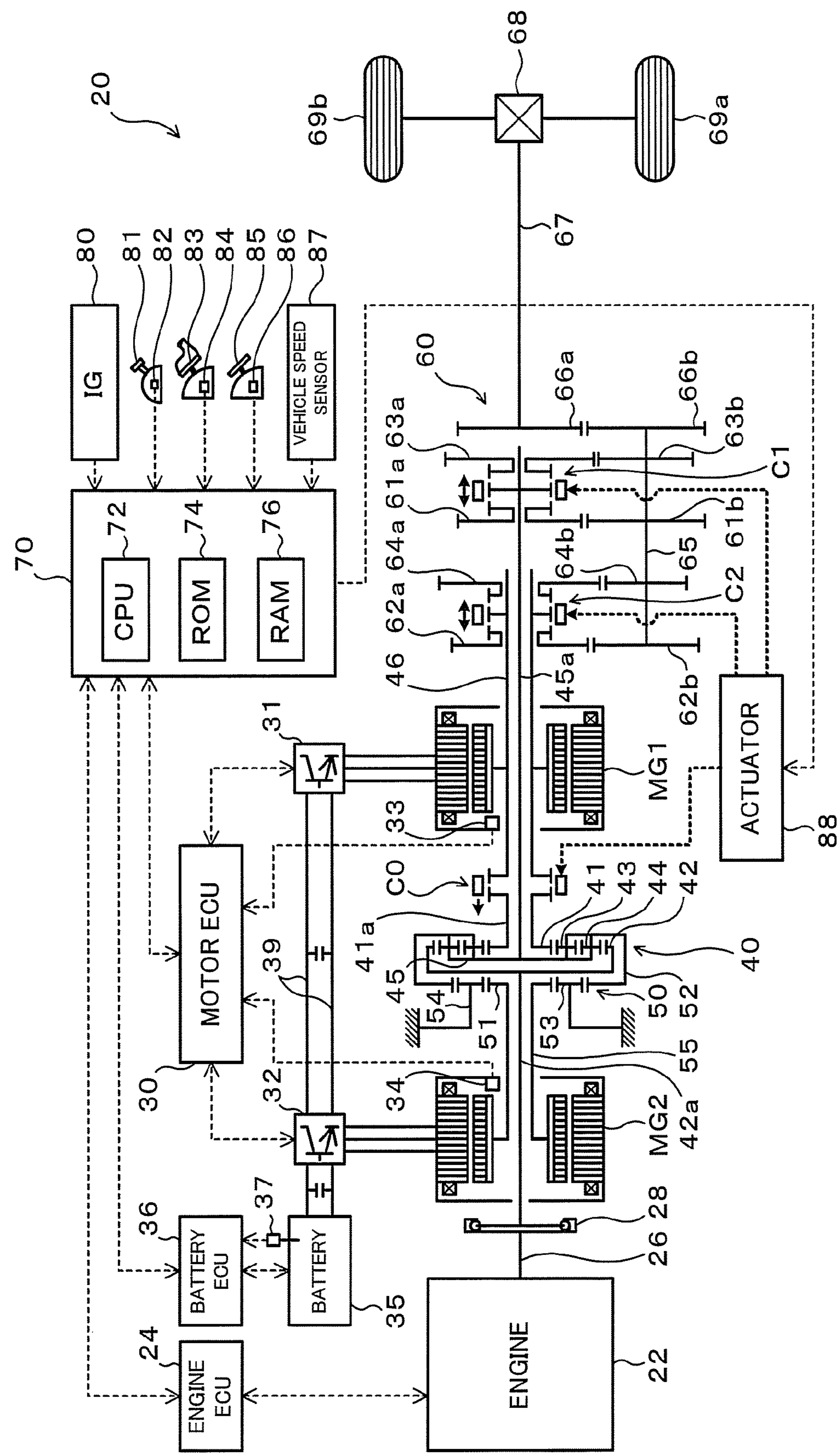
FIG. 1 is a schematic configuration view of a hybrid vehicle 20 in accordance with an embodiment of the present invention.

FIG. 1 is a schematic configuration view of a hybrid vehicle 20 in accordance with a present embodiment of the present invention. The hybrid vehicle 20 shown in the same figure is configured as a rear-wheel-drive vehicle, and includes an engine 22 arranged in a vehicle front portion; a power distribution and integration mechanism (differential rotation mechanism) 40 connected to a crankshaft 26 which is an output shaft of the engine 22; a generatable motor MG1 connected to the power distribution and integration mechanism 40; a generatable motor MG2 arranged coaxially with the motor MG1 and connected to the power distribution and integration mechanism 40 through a reduction gear mechanism 50; a transmission 60 capable of transmitting power from the power distribution and integration mechanism 40 to a drive shaft 67 with a change in speed ratio; and a hybrid electronic control unit (hereinafter referred to as "hybrid ECU") 70 for controlling the entire hybrid vehicle 20 and the like.

The engine 22 is an internal combustion engine which outputs power by receiving a supply of a hydrocarbonaceous fuel such as gasoline and a diesel oil, and receives control of a fuel injection amount, an ignition timing, an intake air amount, and the like from an engine electronic control unit (hereinafter referred to as "engine ECU") 24. The engine ECU 24 receives signals from various kinds of sensors which are provided with respect to the engine 22 and detect an operating state of the engine 22. Moreover, the engine ECU 24 communicates with the hybrid ECU 70, controls the operation of the engine 22 based on control signals from the hybrid ECU 70 and signals from the above sensors, and outputs data about the operating state of the engine 22 to the hybrid ECU 70 as needed.

Each of the motor MG1 and the motor MG2 is configured as a known synchronous generator/motor which can operate not only as a generator, but also as a motor; and supplies and receives electric power to and from a battery 35 which is a secondary battery through inverters 31 and 32. Power lines 39 connecting the inverters 31 and 32 and the battery 35 are configured as a positive electrode bus line and a negative electrode bus line shared by the individual inverters 31 and 32; and are configured such that the power generated by one of the motors MG1 and MG2 can be consumed by the other motor. Therefore, the battery 35 is charged with electric power generated by one of the motors MG1 and MG2 and is discharged due to electric power shortage. If the electric power consumption and generation is balanced between the motors MG1 and MG2, the battery 35 is assumed to be neither charged nor discharged. Both the motors MG1 and MG2 are drive-controlled by a motor electronic control unit (hereinafter referred to as "motor ECU") 30. The motor ECU 30 receives a signal necessary for drive-controlling the motors MG1 and MG2, for example, a signal from rotational position detection sensors 33 and 34 for detecting a rotational position of a rotor of motors MG1 and MG2; and a phase current which is detected by a current sensor (not shown) and is applied to the motors MG1 and MG2. The motor ECU 30 outputs a switching control signal to inverters 31 and 32 and the like. The motor ECU 30 executes a rotation speed calculation routine (not shown) based on a signal inputted from the rotational position detection sensors 33 and 34, and calculates the rotation speeds Nm1 and Nm2 of rotors of the motors MG1 and MG2. Moreover, the motor ECU 30 communicates with the hybrid ECU 70, drive-controls the motors MG1 and MG2 based on control signals from the hybrid ECU 70, and outputs data about the operating states of the motors MG1 and MG2 to the hybrid ECU 70 as needed.

The battery 35 is managed by a battery electronic control unit (hereinafter referred to as "battery ECU") 36. The battery ECU 36 receives a signal necessary for managing the battery 35, for example, an inter-terminal voltage from a voltage sensor (not shown) provided between the terminals of the battery 35; a charge-discharge current from a current sensor (not shown) provided on the power line 39 connected to an output terminal of the battery 35; a battery temperature Tb from a temperature sensor 37 attached to the battery 35, and the like. The battery ECU 36 outputs data about a state of the battery 35 to the hybrid ECU 70 and the engine ECU 24 through communication as needed. Further, the battery ECU 36 calculates a state of charge (SOC) based on an integrated value of charge and discharge currents detected by the current sensor in order to manage the battery 35.

The power distribution and integration mechanism 40 is housed in a transmission case (not shown) together with the motors MG1 and MG2, the reduction gear mechanism 50, the transmission 60, and arranged coaxially with a crankshaft 26 spaced at a predetermined distance from the engine 22. The power distribution and integration mechanism 40 of the present embodiment is a double pinion planetary gear mechanism having a sun gear 41 which is an external gear; a ring gear 42 which is an internal gear arranged concentrically with the sun gear 41; a carrier 45 which rotatably and spinably holds at least one pair of two pinion gears 43 and 44 meshed with each other, one of which is meshed with the sun gear 41 and the other of which is meshed with the ring gear 42; and is configured such that the sun gear 41 (second element), the ring gear 42 (third element), and the carrier 45 (first element) can differentially rotate with each other. According to the present embodiment, the motor MG1 (hollow rotor) serving as the second motor is connected to the sun gear 41 which is a second element of the power distribution and integration mechanism 40 through a hollow sun gear shaft 41*a* extending from the sun gear 41 to an opposite side (rear part of the vehicle) of the engine 22 and a hollow first motor shaft 46. Moreover, the motor MG2 (hollow rotor) serving as the first motor is connected to the carrier 45 which is a first element through the reduction gear mechanism 50 provided between the power distribution and integration mechanism 40 and the engine 22 and a hollow second motor shaft 55 extending toward the engine 22 from the reduction gear mechanism 50 (sun gear 51). Further, a crankshaft 26 of the engine 22 is connected to the ring gear 42 which is a third element through the ring gear shaft 42*a* and a damper 28 extending through the second motor shaft 55 and the motor MG2.

Moreover, as shown in FIG. 1, a clutch C0 (connection/disconnection device) is provided between the sun gear shaft 41*a* and the first motor shaft 46 so as to perform connection (the drive source element connection) and disconnection therebetween. According to the present embodiment, the clutch C0 is configured, for example, as a dog clutch which can mesh a dog fixed to a leading edge of the sun gear shaft 41*a* with a dog fixed to a leading edge of the first motor shaft 46 and can also release the mesh therebetween with less loss; and is driven by an electric, electromagnetic, or hydraulic actuator 88. When the clutch C0 releases the connection between the sun gear shaft 41*a* and the first motor shaft 46, the connection between the motor MG1 serving as the second motor and the sun gear 41 which is a second element of the power distribution and integration mechanism 40 is also released accordingly. In short, the functions of the power distribution and integration mechanism 40 can subsequently disconnect the engine 22 from the motors MG1 and MG2 and the transmission 60.

Then, the first motor shaft 46 capable of being coupled to the sun gear 41 of the power distribution and integration mechanism 40 through the clutch C0 further extends from the motor MG1 to an opposite side (rear part of the vehicle) of the engine 22, and is connected to the transmission 60. Moreover, a carrier shaft (coupling shaft) 45*a* extends from the carrier 45 of the power distribution and integration mechanism 40 to an opposite side (rear part of the vehicle) of the engine 22 through the hollow sun gear shaft 41*a* and the first motor shaft 46, and the carrier shaft 45*a* is also connected to the transmission 60. Thereby, according to the present embodiment, the power distribution and integration mechanism 40 is provided between the motors MG1 and MG2 which are arranged coaxially with each other, and is arranged coaxially with both the motors MG1 and MG2; and the engine 22 is arranged in parallel to and coaxially with the motor MG2 and faces the transmission 60 with the power distribution and integration mechanism 40 therebetween. That is, according to the present embodiment, the components of the power output apparatus such as the engine 22, the motors MG1 and MG2, the power distribution and integration mechanism 40, and the transmission 60 are arranged starting with the front part of the vehicle, namely, the engine 22, the motor MG2, (reduction gear mechanism 50), the power distribution and integration mechanism 40, the motor MG1, and the transmission 60 in that order. This arrangement allows the power output apparatus to be compact in size, excellent in mountability, and preferable for the hybrid vehicle 20 which runs mainly by driving rear wheels.

Moreover, according to the present embodiment, as described above, the sun gear 41 which is a second element of the power distribution and integration mechanism 40 is connected to the transmission 60 through the sun gear shaft 41*a*, and the clutch C0, and the first motor shaft 46; and the carrier 45 which is a first element of the power distribution and integration mechanism 40 is connected to the transmission 60 through the carrier shaft 45*a*. Thereby, according to the hybrid vehicle 20, one of the sun gear 41 and the carrier 45 of power distribution and integration mechanism 40 is set to a reaction element receiving a reaction of a torque outputted from the engine 22, and the other is set to an output element; and thereby power can be outputted to the transmission 60. If the sun gear 41 is set to the reaction element, the motor MG1 functions as a generator. In this case, the power distribution and integration mechanism 40 receives power from the engine 22 through the ring gear 42 and distributes the power to the sun gear 41 side and the carrier 45 side according to the gear ratio; integrates the power from the engine 22 and power from the motor MG2 functioning as a motor and outputs the integrated power to the carrier 45 side. If the carrier 45 is set to the reaction element, the motor MG2 functions as a generator. In this case, the power distribution and integration mechanism 40 receives power from the engine 22 through the ring gear 42 and distributes the power to the sun gear 41 side and the carrier 45 side according to the gear ratio; integrates the power from the engine 22 and the power from the motor MG1 functioning as a motor and outputs the integrated power to the sun gear 41 side.

The reduction gear mechanism 50 is a single pinion planetary gear mechanism having a sun gear 51 which is an external gear; a ring gear 52 which is an internal gear arranged concentrically with the sun gear 51; a plurality of pinion gears 53 which are meshed with both the sun gear 51 and the ring gear 52; and a carrier 54 which rotatably and spinably holds the plurality of pinion gears 53. The sun gear 51 of the reduction gear mechanism 50 is connected to a rotor of the motor MG2 through the above described second motor shaft 55. Moreover, the ring gear 52 of the reduction gear mechanism 50 is fixed to the carrier 45 of the power distribution and integration mechanism 40. Thereby, the reduction gear mechanism 50 is substantially integral with the power distribution and integration mechanism 40. The carrier 54 of the reduction gear mechanism 50 is fixed with respect to the transmission case. Therefore, by the operation of the reduction gear mechanism 50, the power from the motor MG2 is reduced in speed and is inputted to the carrier 45 of the power distribution and integration mechanism 40; and at the same time, the power from the carrier 45 is increased in speed and is inputted to the motor MG2. It should be noted that as shown in the present embodiment, the power output apparatus can be more compact by placing the reduction gear mechanism 50 between the motor MG2 and the power distribution and integration mechanism 40 so as to be formed integrally with the power distribution and integration mechanism 40.

The transmission 60 is configured as an automatic parallel shaft-type transmission capable of setting the speed ratio at a plurality of stages, and includes: a first counter drive gear 61*a* and a first counter driven gear 61*b* constituting the first speed gear train; a second counter drive gear 62*a* and a second counter driven gear 62*b* constituting the second speed gear train; a third counter drive gear 63*a* and a third counter driven gear 63*b* constituting the third speed gear train; a fourth counter drive gear 64*a* and a fourth counter driven gear 64*b* constituting the fourth speed gear train; a countershaft 65 to which individual counter driven gears 61*b* to 64*b* and a gear 66*b* are fixed; clutches C1 and C2; a gear 66*a* attached to the drive shaft 67; further a reverse gear train (not shown) and the like (hereinafter, as needed, a "counter drive gear" and a "counter driven gear" are simply referred to as a "gear"). It should be noted that according to the transmission 60, the first speed gear train has the largest speed ratio; and shifting from first to second to third and to fourth speed gear trains reduces the speed ratio accordingly.

As shown in FIG. 1, the first gear 61*a* of the first speed gear train is held rotatably and non-movably in the axial direction on the carrier shaft 45*a* extended from the carrier 45 which is the first element of the power distribution and integration mechanism 40 and is always meshed with the first gear 61*b* fixed to the countershaft 65. Likewise, the third gear 63*a* of the third speed gear train is also held rotatably and non-movably in the axial direction on the carrier shaft 45*a*, and is always meshed with the third gear 63*b* fixed to the countershaft 65. According to the present embodiment, the clutch C1 is provided on the carrier shaft 45*a* side (counter drive gear side) so as to selectively fix one of the first gear 61*a* (first speed gear train) and the third gear 63*a* (third speed gear train) to the carrier shaft 45*a* and to be able to rotatably release both the first gear 61*a* and the third gear 63*a* with respect to the carrier shaft 45*a*. According to the present embodiment, the clutch C1 is configured as, for example, a dog clutch which can mesh a dog which is held non-rotatably and movably in the axial direction on the carrier shaft 45*a* with one of the dog fixed to the first gear 61*a* and the dog fixed to the third gear 63*a* with less loss, and can release the mesh therebetween; and is driven by the above described actuator 88. These gears 61*a* and 61*b* of the first speed gear train, the gears 63*a* and 63*b* of the third speed gear train, and the clutch C1 constitute a first transmission mechanism of the transmission 60. Moreover, the second gear 62*a* of the second speed gear train is held rotatably and non-movably in the axial direction on the first motor shaft 46 capable of being coupled with the sun gear 41 which is a second element of the power distribution and integration mechanism 40 through the clutch C0; and is always meshed with the second gear 62*b* fixed to the countershaft 65. Likewise, the fourth gear 64*a* of the fourth speed gear train is also held rotatably and non-movably in the axial direction on the first motor shaft 46, and is always meshed with the fourth gear 64*b* fixed to the countershaft 65. According to the present embodiment, the clutch C2 is provided at the first motor shaft 46 side (counter drive gear side) so as to selectively fix one of the second gear 62*a* (second speed gear train) and the fourth gear 64*a* (fourth speed gear train) with respect to the first motor shaft 46 and to be able to rotatably release both the second gear 62*a* and the fourth gear 64*a* with respect to the first motor shaft 46. According to the present embodiment, the clutch C2 is also configured as, for example, a dog clutch which can mesh a dog which is held non-rotatably and movably in the axial direction on the first motor shaft 46 with one of the dog fixed to the second gear 62*a* and the dog fixed to the fourth gear 64*a* with less loss, and can release the mesh therebetween; and is driven by the above described actuator 88. These gears 62*a* and 62*b* of the second speed gear train, the gears 64*a* and 64*b* of the fourth speed gear train, and the clutch C2 constitute a second transmission mechanism of the transmission 60. It should be noted that according to the present embodiment, the actuator 88 is illustrated as a single unit, but it is obvious that the clutches C0, C1, and C2 may be driven individually.

Moreover, the power transmitted from the carrier shaft 45*a* or the first motor shaft 46 to the countershaft 65 is transmitted to the drive shaft 67 through the gears 66*a* and 66*b*, and is finally output to the rear wheels 69*a* and 69*b* as the drive wheels through the differential gear 68. It should be noted that, like the transmission 60 of the present embodiment, the clutches C1 and C2 are provided on the carrier shaft 45*a* and the first motor shaft 46 side, thereby enabling the reduction of the loss when the gears 61*a* to 64*a* are fixed to the carrier shaft 45*a* or the first motor shaft 46 by the clutches C1 and C2. That is, depending on the gear ratio of an individual gear train, particularly regarding the second transmission mechanism including the fourth speed gear train having a small reduction gear ratio, the rotation speed of the gear 64*a* which is idle before being fixed to the first motor shaft 46 by the clutch C2 is lower than the rotation speed of the corresponding gear 64*b* on the countershaft 65 side. Therefore, a dog of the gear 64*a* can be engaged with a dog of the first motor shaft 46 with less loss by at least installing the clutch C2 on the first motor shaft 46 side. It should be noted that regarding the first transmission mechanism including the first speed gear train having a large reduction gear ratio, the clutch C1 may be provided on the countershaft 65 side.

According to the transmission 60 configured as described above, when the clutch C2 is released, as well as one of the first gear 61*a* (first speed gear train) and the third gear 63*a* (third speed gear train) is fixed to the carrier shaft 45*a* by the clutch C1, the power from the carrier shaft 45*a* can be transmitted to the drive shaft 67 through the first gear 61*a* (first speed gear train) or the third gear 63*a* (third speed gear train) and the countershaft 65. Moreover, when the clutch C0 is connected, the clutch C1 is released, and the clutch C2 is used to fix one of the second gear 62*a* (second speed gear train) and the fourth gear 64*a* (fourth speed gear train) to the first motor shaft 46, the power from the first motor shaft 46 can be transmitted to the drive shaft 67 through the second gear 62*a* (second speed gear train) or the fourth gear 64*a* (fourth speed gear train) and the countershaft 65. Hereinafter, as needed, a state of transmitting power using the first speed gear train is referred to as "first speed state (1st speed)", a state of transmitting power using the second speed gear train is referred to as "second speed state (2nd speed)", a state of transmitting power using the third speed gear train is referred to as "third speed state (3rd speed)" and a state of transmitting power using the fourth speed gear train is referred to as "fourth speed state (4th speed)". Moreover, according to the transmission 60 of the present embodiment, the clutches C1 and C2 are provided on the carrier shaft 45*a* and the first motor shaft 46 side, thereby enabling the reduction of the loss when the gears 61*a* to 64*a* are fixed to the carrier shaft 45*a* or the first motor shaft 46 by the clutches C1 and C2. That is, depending on the gear ratio of an individual gear train, particularly regarding the second transmission mechanism including the fourth speed gear train having a small reduction gear ratio, the rotation speed of the gear 64*a* which is idle before being fixed to the first motor shaft 46 by the clutch C2 is lower than the rotation speed of the corresponding gear 64*b* on the countershaft 65 side. Therefore, a dog of the gear 64*a* can be engaged with a dog of the first motor shaft 46 with less loss by at least installing the clutch C2 on the first motor shaft 46 side. It should be noted that regarding the first transmission mechanism including the first speed gear train having a large reduction gear ratio, the clutch C1 may be provided on the countershaft 65 side.

The hybrid ECU 70 is configured as a microprocessor around a CPU 72, and in addition to the CPU 72, includes a ROM 74 for storing a processing program; a RAM 76 for temporarily storing data; an input/output port (not shown); and a communication port (not shown). The hybrid ECU 70 receives an ignition signal from an ignition switch (start switch) 80; a shift position SP from a shift position sensor 82 for detecting the shift position SP which is an operation position of a shift lever 81; an accelerator opening Acc from an accelerator pedal position sensor 84 for detecting the amount of depression of an accelerator pedal 83; a brake pedal position BP from a brake pedal position sensor 86 for detecting the amount of depression of a brake pedal 85; and a vehicle speed V from a vehicle speed sensor 87 through the input port. As described above, the hybrid ECU 70 is connected to the engine ECU 24, the motor ECU 30, and the battery ECU 36 through a communication port, and sends and receives various kinds of control signals and data to and from the engine ECU 24, the motor ECU 30, and the battery ECU 36. Moreover, the hybrid ECU 70 also controls the actuator 88 which drives the clutch C0, and the clutches C1 and C2 of the transmission 60.

Figure 2:
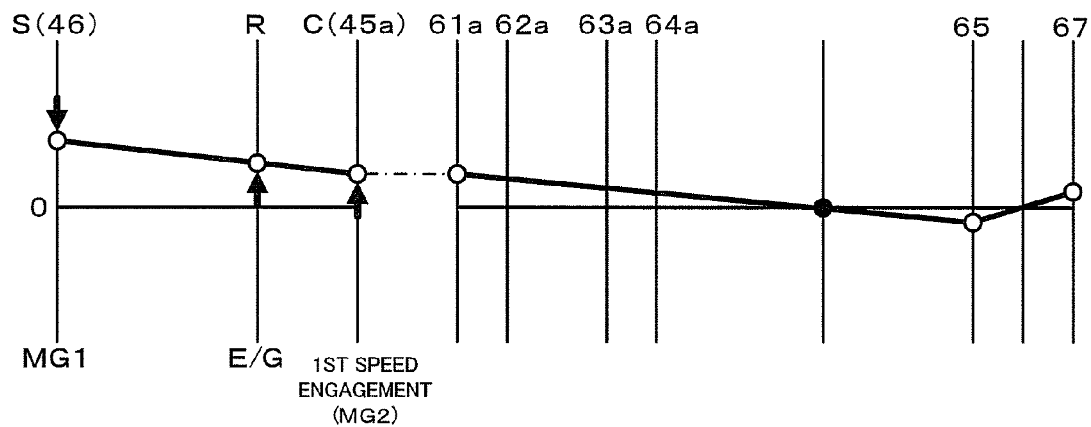
FIG. 2 is an explanatory drawing illustrating a relationship of a rotation speed and a torque of major elements of a power distribution and integration mechanism 40 and a transmission 60 when the speed ratio of the transmission 60 is changed according to the speed change of the vehicle when the hybrid vehicle 20 of the present embodiment runs with an operation of an engine 22.
Figure 3:
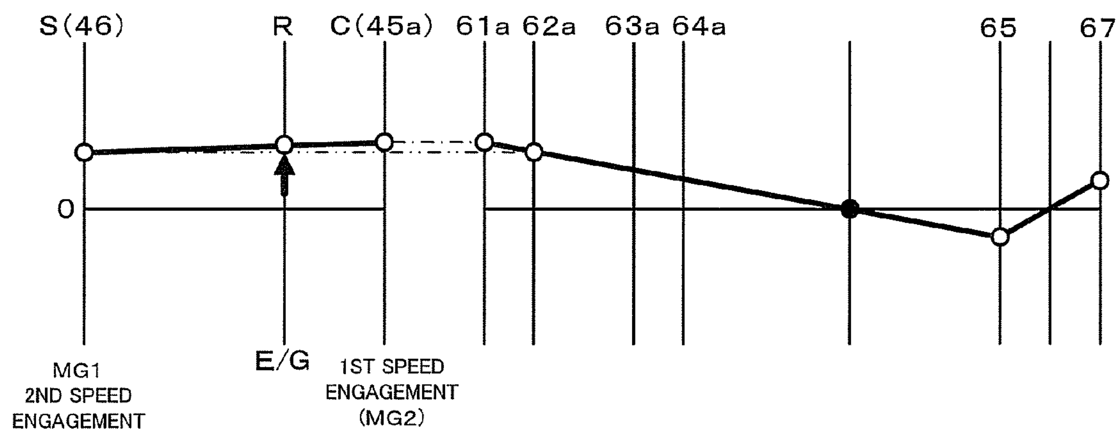
FIG. 3 is an explanatory drawing similar to FIG. 2.

Hereinafter, with reference to FIGS. 2 to 8, the outline of an operation of the hybrid vehicle 20 of the present embodiment will be described. When the above described hybrid vehicle 20 runs with an engagement of the clutch C0 and an operation of the engine 22, if the clutch C2 is released and the first gear 61*a* (first speed gear train) is fixed to the carrier shaft 45*a* by the clutch C1, as shown in FIG. 2, the power from the carrier shaft 45*a* can be changed in speed (reduced) based on the speed ratio of the first speed gear train (first gears 61*a* and 61*b*) and can be output to the drive shaft 67. Moreover, according to the change in vehicle speed V, as shown in FIG. 3, in the first speed state in which the first gear 61*a* (first speed gear train) is fixed to the carrier shaft 45*a* by the clutch C1, if the second gear 62*a* (second speed gear train) is fixed to the first motor shaft 46 by the clutch C2 and each of the torque commands to the motors MG1 and MG2 is set to a value of 0, the power (torque) from the engine 22 can be transmitted mechanically (directly) to the drive shaft 67 without conversion to electrical energy at a fixed (constant) speed ratio (a value between the speed ratio of the first speed gear train and the speed ratio of the second speed gear train). Hereinafter, the state (FIG. 3) in which the first speed gear train of the transmission 60 is used to couple the carrier 45 which is a first element of the power distribution and integration mechanism 40, and the second speed gear train of the transmission 60 is used to couple the sun gear 41 which is a second element thereof to the drive shaft 67 respectively is referred to as "1st to 2nd simultaneous engagement state".

Figure 4:
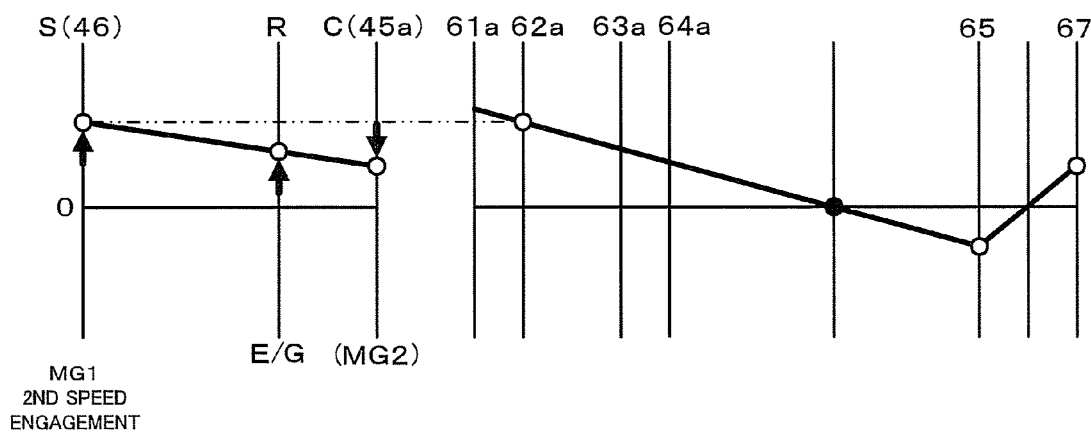
FIG. 4 is an explanatory drawing similar to FIG. 2.
Figure 5:
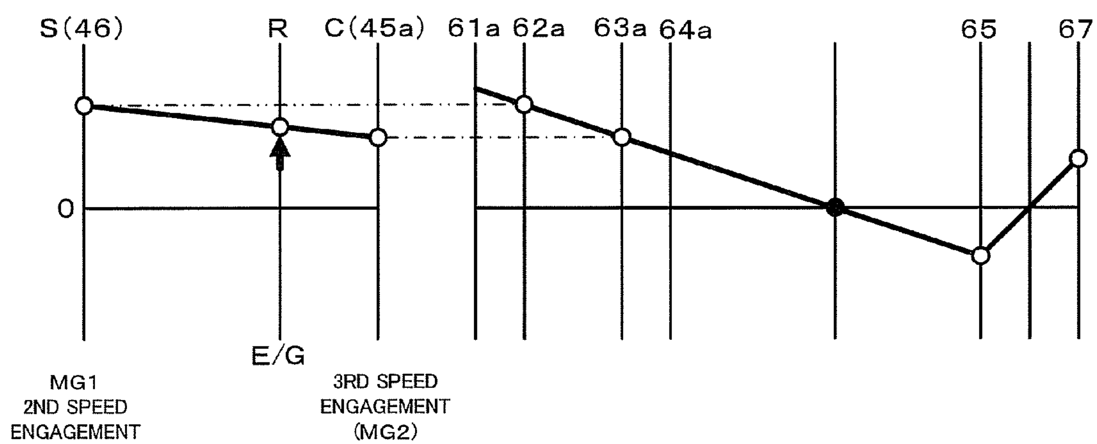
FIG. 5 is an explanatory drawing similar to FIG. 2.

Further, in the 1st to 2nd simultaneous engagement state shown in FIG. 3, when the clutch C1 is released as shown by the two-dot chain line in FIG. 4, the clutch C2 allows only the second gear 62*a* (second speed gear train) to be fixed to the first motor shaft 46 (sun gear 41) and thereby, the power from the first motor shaft 46 can be changed in speed based on the speed ratio of the second speed gear train (second gears 62*a* and 62*b*) and can be output to the drive shaft 67. Moreover, according to the change in vehicle speed V, in the second speed state in which the clutch C2 is used to fix the second gear 62*a* (second speed gear train) to the first motor shaft 46 as shown in FIG. 5, if the clutch C1 is used to fix the third gear 63*a* (third speed gear train) to the carrier shaft 45*a* and set each of the torque commands to the motors MG1 and MG2 to a value of 0, the power (torque) from the engine 22 can be transmitted mechanically (directly) to the drive shaft 67 without conversion to electrical energy at a fixed (constant) speed ratio (a value between the speed ratio of the second speed gear train and the speed ratio of the third speed gear train) different from that in the 1st to 2nd simultaneous engagement state. Hereinafter, the state (FIG. 5) in which the second speed gear train of the transmission 60 is used to couple the sun gear 41 which is a second element of the power distribution and integration mechanism 40, and the third speed gear train of the transmission 60 is used to couple to carrier 45 which is a first element thereof to the drive shaft 67 is referred to as "2nd to 3rd simultaneous engagement state".

Figure 6:
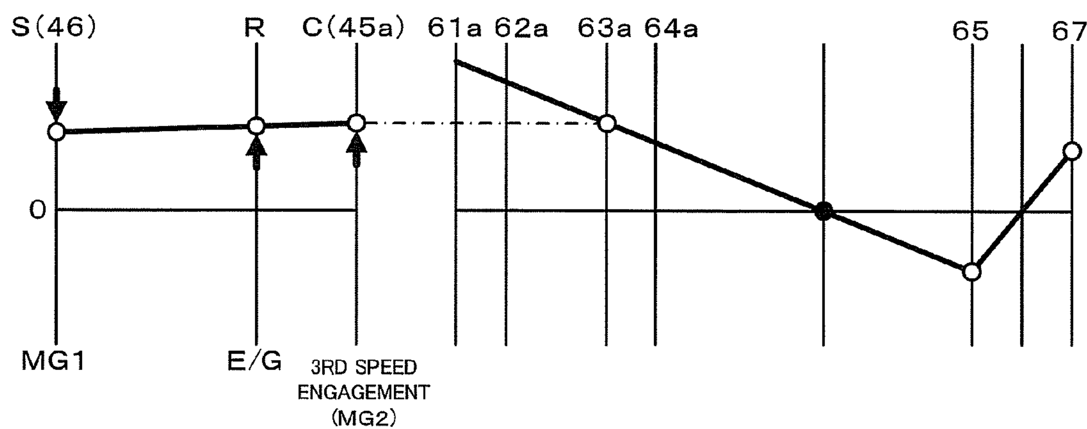
FIG. 6 is an explanatory drawing similar to FIG. 2.
Figure 7:
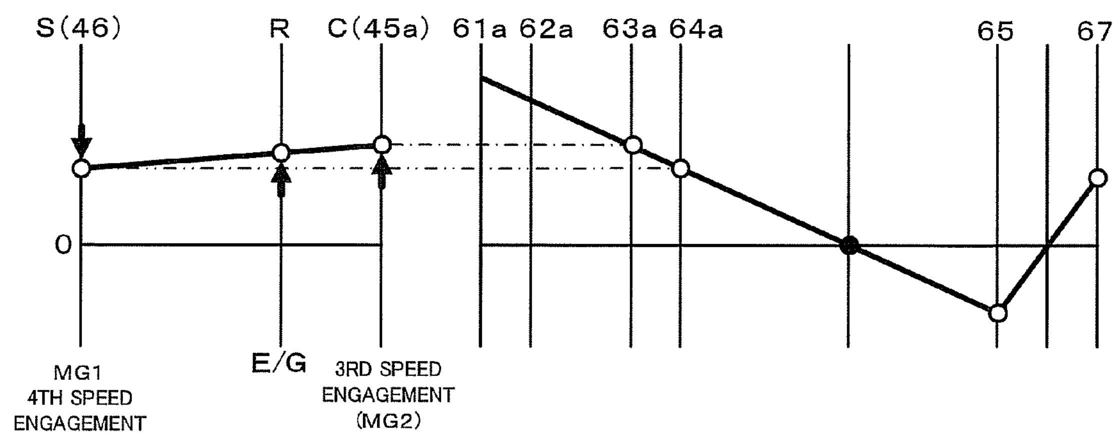
FIG. 7 is an explanatory drawing similar to FIG. 2.
Figure 8:
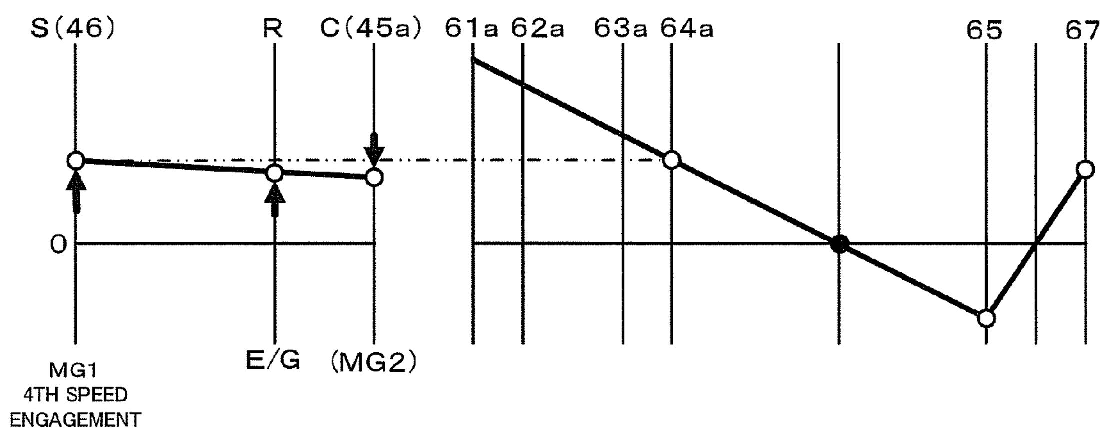
FIG. 8 is an explanatory drawing similar to FIG. 2.

Then, when the clutch C2 is released in the 2nd to 3rd simultaneous engagement state shown in FIG. 5, as shown by the one-dot chain line in FIG. 6, the clutch C1 allows only the third gear 63*a* (third speed gear train) to be fixed to the carrier shaft 45*a* (carrier 45). Thereby, the power from the carrier shaft 45*a* can be changed in speed based on the speed ratio of the third speed gear train (third gears 63*a* and 63*b*) and can be output to the drive shaft 67. Further, according to the change in vehicle speed V as shown in FIG. 7, in the third speed state in which the clutch C1 is used to fix the third gear 63*a* (third speed gear train) to the carrier shaft 45*a*, when the clutch C2 is used to fix the fourth gear 64*a* (fourth speed gear train) to the first motor shaft 46 and set the individual torque command to the motors MG1 and MG2 to a value of 0, the power (torque) from the engine 22 can be transmitted mechanically (directly) to the drive shaft 67 without conversion to electrical energy at a fixed (constant) speed ratio (a value between the speed ratio of the third speed gear train and the speed ratio of the fourth speed gear train) different from that in the 1st to 2nd simultaneous engagement state and the 2nd to 3rd simultaneous engagement state. Hereinafter, the state (FIG. 7) in which the third speed gear train of the transmission 60 is used to fix the carrier 45 which is a first element of the power distribution and integration mechanism 40, and the fourth speed gear train of the transmission 60 is used to fix the sun gear 41 which is a second element thereof to the drive shaft 67 respectively is referred to as "3rd to 4th simultaneous engagement state". Afterward, in the 3rd to 4th simultaneous engagement state shown in FIG. 7, when the clutch C1 is released as shown by the two-dot chain line in FIG. 8, the clutch C2 allows only the fourth gear 64*a* (fourth speed gear train) to be fixed to the first motor shaft 46 (sun gear 41). Thereby, the power from the first motor shaft 46 can be changed in speed based on the speed ratio of the fourth speed gear train (fourth gears 64*a* and 64*b*) and can be output to the drive shaft 67. Here, with reference to FIGS. 2 to 8, the S axis indicates a rotation speed (rotation speed Nm1 of the motor MG1, namely, the first motor shaft 46) of the sun gear 41 of the power distribution and integration mechanism 40; the R axis indicates a rotation speed (rotation speed Ne of the engine 22)

of the ring gear 42 of the power distribution and integration mechanism 40; and the C axis indicates a rotation speed (the carrier shaft 45*a* and the ring gear 52 of the reduction gear mechanism 50) of the carrier 45 of the power distribution and integration mechanism 40 respectively. Moreover, each of the 61*a* axis to 63*a* axis, the 65 axis, and the 67 axis indicates a rotation speed of the first gear 61*a* to the fourth gear 64*a* of the transmission 60, the countershaft 65, and the drive shaft 67 respectively.

Figure 9:
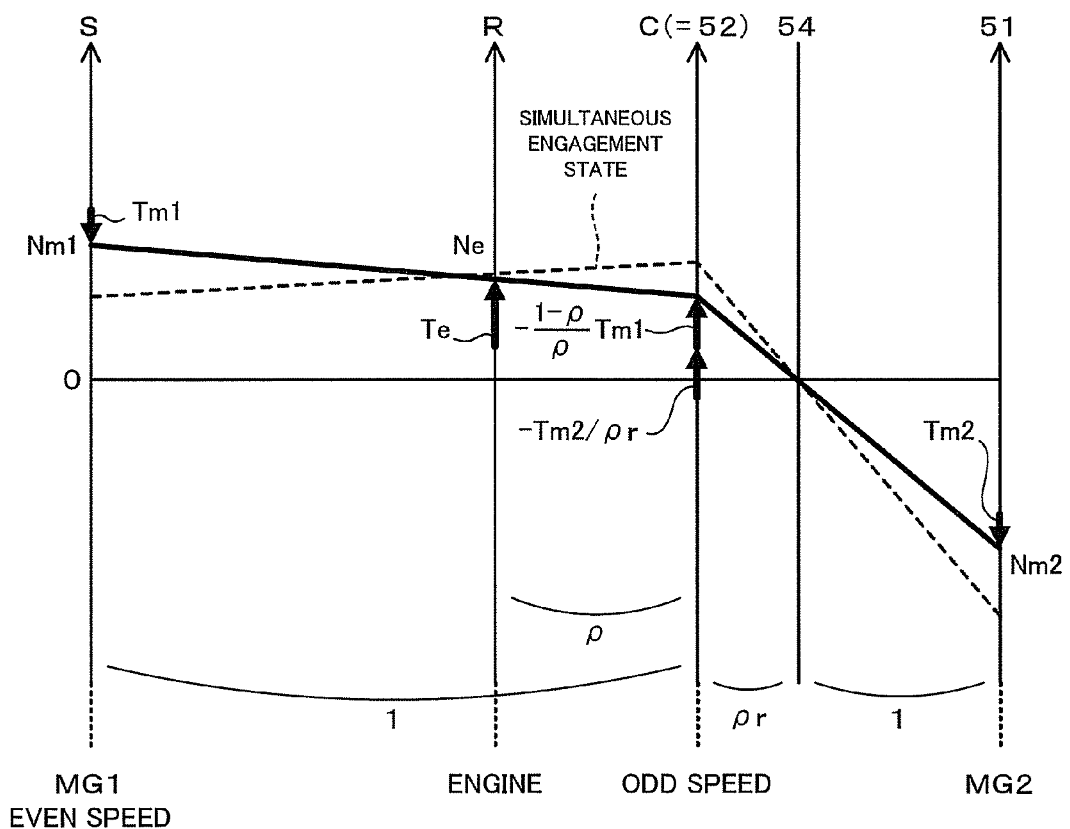
FIG. 9 is an explanatory drawing showing an example of an alignment chart representing a relationship of a rotation speed and a torque between an individual element of the power distribution and integration mechanism 40 and an individual element of a reduction gear mechanism 50 when a motor MG1 functions as a generator and a motor MG2 functions as a motor.
Figure 10:
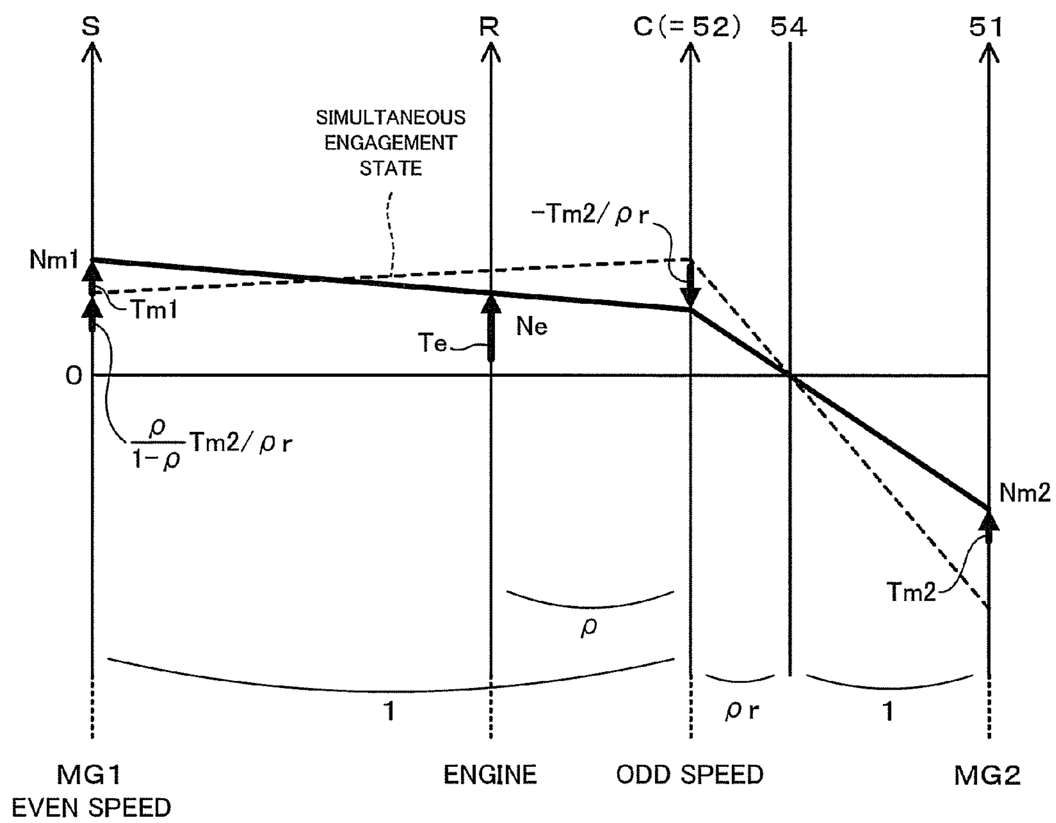
FIG. 10 is an explanatory drawing showing an example of an alignment chart representing a relationship of a rotation speed and a torque between an individual element of the power distribution and integration mechanism 40 and an individual element of the reduction gear mechanism 50 when the motor MG2 functions as a generator and the motor MG1 functions as a motor.

While the hybrid vehicle 20 is running with an operation of the engine 22 as described above, when the transmission 60 is set to the first or third speed state, the carrier 45 of the power distribution and integration mechanism 40 becomes an output element, thereby allowing the motors MG1 and MG2 to be drive-controlled such that the motor MG2 connected to the carrier 45 functions as a motor, and the motor MG1 connected to the sun gear 41 which becomes a reaction element functions as a generator. Hereinafter, the mode in which the motor MG1 functions as a generator and the motor MG2 functions as a motor is referred to as a "first torque conversion mode". FIG. 9 shows an example of an alignment chart representing a relationship of a rotation speed and torque between an individual element of the power distribution and integration mechanism 40 and an individual element of the reduction gear mechanism 50 in the first torque conversion mode. Here, with reference to FIG. 9, the S axis, the R axis, and the C axis denote like elements shown in FIGS. 2 to 8; the 54 axis denotes a rotation speed of the carrier 54 of the reduction gear mechanism 50; the 51 axis denotes a rotation speed (rotation speed Nm2 of the motor MG2, namely, the second motor shaft 55) of the sun gear 51 of the reduction gear mechanism 50; ρ denotes a gear ratio (the number of teeth of the sun gear 41/the number of teeth of the ring gear 42) of the power distribution and integration mechanism 40; and ρr denotes a reduction gear ratio (the number of teeth of the sun gear 51/the number of teeth of the ring gear 52) of the reduction gear mechanism 50 respectively. Moreover, in FIG. 9, a thick arrow indicates torque acting on an individual element. An upward arrow in the Figure indicates that the value of torque is positive; and a downward arrow in the Figure indicates that the value of torque is negative (same as in FIGS. 2 to 8, 10 and 11). In the first torque conversion mode, the power distribution and integration mechanism 40 and the motors MG1 and MG2 perform torque conversion on power from the engine 22 and output the power to the carrier 45; and the ratio between the rotation speed Ne of the engine 22 and the rotation speed of the carrier 45 which is an output element can be changed steplessly and continuously by controlling the rotation speed of the motor MG1. While the hybrid vehicle 20 is running with an operation of the engine 22, when the transmission 60 is set to the second or fourth speed state, the sun gear 41 of the power distribution and integration mechanism 40 becomes the output element, thereby allowing the motors MG1 and MG2 to be drive-controlled such that the motor MG1 connected to the sun gear 41 functions as a motor, and the motor MG2 connected to the carrier 45 which becomes a reaction element functions as a generator. Hereinafter, the mode in which the motor MG2 functions as a generator and the motor MG1 functions as a motor is referred to as a "second torque conversion model". FIG. 10 shows an example of an alignment chart representing a relationship of a rotation speed and torque between an individual element of the power distribution and integration mechanism 40 and an individual element of the reduction gear mechanism 50 in the second torque conversion mode. In the second torque conversion mode, the power distribution and integration mechanism 40 and the motors MG1 and MG2 perform torque conversion on power from the engine 22 and output the power to the sun gear 41, and the ratio between the rotation speed Ne of the engine 22 and the rotation speed of the sun gear 41 which is an output element can be changed steplessly and continuously by controlling the rotation speed of the motor MG2. It should be noted that the reference characters in FIG. 10 are the same as in FIG. 9.

As described above, according to the hybrid vehicle 20 of the present embodiment, with the change in speed ratio (speed state) of the transmission 60, the first torque conversion mode and the second torque conversion mode can be alternately switched; and thus, particularly when the rotation speed Nm2 or Nm1 of the motor MG2 or MG1 which functions as a motor is increased, the rotation speed Nm1 or Nm2 of the motor MG1 or MG2 which functions as a generator can be prevented from having a negative value. Therefore, the hybrid vehicle 20 can prevent the occurrence of a power circulation in which as the rotation speed of the motor MG1 becomes negative in the first torque conversion mode, the motor MG2 uses part of the power output to the carrier shaft 45*a* to generate electric power and the motor MG1 consumes the electric power generated by the motor MG2 and outputs the power; and a power circulation in which as the rotation speed of the motor MG2 becomes negative in the second torque conversion mode, the motor MG1 uses part of the power output to the first motor shaft 46 to generate electric power and the motor MG2 consumes the electric power generated by the motor MG1 and outputs the power; and can improve power transmission efficiency in a wider driving area. Moreover, as such a power circulation is prevented, a maximum rotation speed of the motors MG1 and MG2 can also be suppressed, thereby allowing the motors MG1 and MG2 to be made compact. Further, the hybrid vehicle 20 can mechanically (directly) transmit power from the engine 22 to the drive shaft 67 at a speed ratio uniquely determined depending on the above described 1st to 2nd simultaneous engagement state, the 2nd to 3rd simultaneous engagement state, and the 3rd to 4th simultaneous engagement state, thereby increasing a chance of mechanically outputting the power from the engine 22 to the drive shaft 67 without conversion to electrical energy and further increasing power transmission efficiency in a wider driving area. In general, according to a power output apparatus using the engine, two motors, and the differential rotation mechanism such as a planetary gear mechanism, when the reduction gear ratio between the engine and the drive shaft is relatively large, more engine power is converted to electrical energy, and thus the power transmission efficiency is deteriorated, and the motors MG1 and MG2 tend to generate heat. Therefore, the above described simultaneous engagement mode is advantageous particularly when the reduction gear ratio between the engine 22 and the drive shaft is relatively large. Further, according to the hybrid vehicle 20 of the present embodiment, before the speed ratio of the transmission 60 is changed, the simultaneous engagement mode is performed between the first torque conversion mode and the second torque conversion mode. Therefore, a so-called torque loss does not occur at the time of change in speed ratio, and the change in speed ratio, namely, the switching between the first torque conversion mode and the second torque conversion mode can be performed very smoothly and without a shock.

Figure 11:
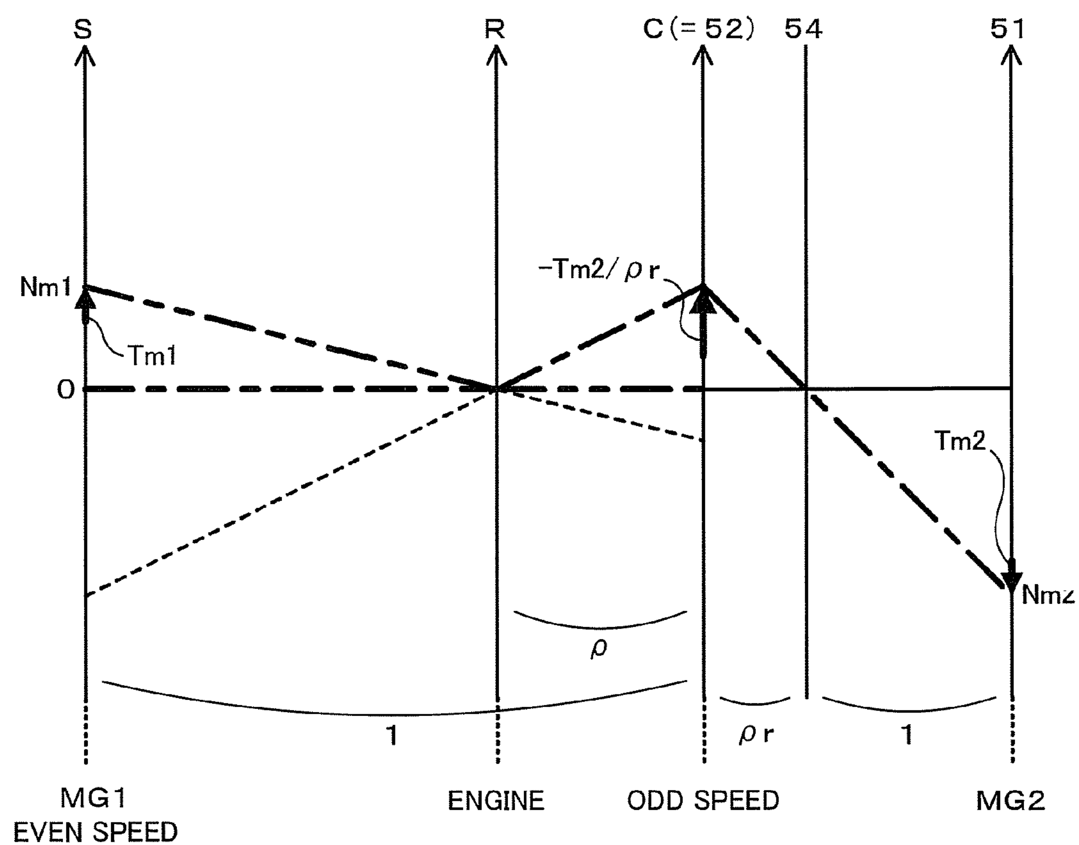
FIG. 11 is an explanatory drawing for explaining a motor drive mode in the hybrid vehicle 20 of the present embodiment.

Next, with reference to FIG. 11 and the like, the outline of the motor drive mode will be described, in which, in an engine 22 stopped state, electric power from the battery 35 is used to cause the motor MG1 and/or the motor MG2 to output power, by which the hybrid vehicle 20 is driven. According to the hybrid vehicle 20 of the present embodiment, the motor drive mode is broadly classified into a clutch engagement single motor drive mode in which the clutch C0 is connected and one of the motors MG1 and MG2 is caused to output power; a clutch release single motor drive mode in which the clutch C0 is placed in a released state and one of the motors MG1 and MG2 is caused to output power; and a double motor drive mode in which the clutch C0 is placed in a released state and power from both the motors MG1 and MG2 can be used.

When the clutch engagement single motor drive mode is performed, with the clutch C0 being connected, the clutch C2 of the transmission 60 is placed in a released state and the clutch C1 is used to fix the first gear 61*a* of the first speed gear train or the third gear 63*a* of the third speed gear train to the carrier shaft 45*a* to cause only the motor MG2 to output the power, or the clutch C1 of the transmission 60 is placed in a released state and the clutch C2 is used to fix the second gear 62*a* of the second speed gear train or the fourth gear 64*a* of the fourth speed gear train to the first motor shaft 46 to cause only the motor MG1 to output the power. In such a clutch engagement single motor drive mode, the clutch C0 allows the sun gear 41 of the power distribution and integration mechanism 40 and the first motor shaft 46 to be connected. Therefore, the motor MG1 or MG2 which does not output power is idle by being corotated by the motor MG2 or MG1 which is outputting power (see the broken line in FIG. 11). Moreover, when the clutch release single motor drive mode is performed, the clutch C0 is placed in a released state, the clutch C2 of the transmission 60 is placed in a released state, and the clutch C1 is used to fix the first gear 61*a* of the first speed gear train or the third gear 63*a* of the third speed gear train to the carrier shaft 45*a* to cause only the motor MG2 to output power, or the clutch C1 of the transmission 60 is placed in a released state, the clutch C2 is used to fix the second gear 62*a* of the second speed gear train or the fourth gear 64*a* of the fourth speed gear train to the first motor shaft 46 to cause only the motor MG1 to output power. In such a clutch release single motor drive mode, as shown by the one-dot chain line and the two-dot chain line in FIG. 11, the clutch C0 is placed in a released state, and the connection between the sun gear 41 and the first motor shaft 46 is released. Therefore, the crankshaft 26 of the engine 22 which is stopped by a function of the power distribution and integration mechanism 40 is prevented from corotating. In addition, since the clutch C2 or C1 is placed in a released state, the motor MG1 or MG2 which is stopped can be prevented from corotating, thereby preventing power transmission efficiency from decreasing. When the double motor drive mode is performed, the clutch C0 is placed in a released state, and the clutches C1 and C2 are used to set the transmission 60 to the above described the 1st to 2nd simultaneous engagement state, the 2nd to 3rd simultaneous engagement state, or the 3rd to 4th simultaneous engagement state, and then, at least one of the motors MG1 and MG2 is drive-controlled. This can prevent the engine 22 from corotating, can cause both the motors MG1 and MG2 to output power, and can transmit large power to the drive shaft 67 in the motor drive mode. Therefore, a so-called starting on a slope can be well performed and a good towing capability and the like at a motor drive can be well maintained.

Moreover, according to the hybrid vehicle 20 of the present embodiment, when the clutch release single motor drive mode is selected, the speed ratio (speed state) of the transmission 60 can be easily changed so as to efficiently transmit power to the drive shaft 67. For example, in the clutch release single motor drive mode, the clutch C1 of the transmission 60 is used to fix the first gear 61*a* of the first speed gear train or the third gear 63*a* of the third speed gear train to the carrier shaft 45*a* and causes only the motor MG2 to output power. At this time, the rotation speed of the stopped motor MG1 is synchronized with the rotation speed of the second gear 62*a* of the second speed gear train or the fourth gear 64*a* of the fourth speed gear train, and the clutch C2 is used to fix the second gear 62*a* or the fourth gear 64*a* to the first motor shaft 46. By doing so, the state can be changed to one of the above described 1st to 2nd simultaneous engagement state, the 2nd to 3rd simultaneous engagement state, and the 3rd to 4th simultaneous engagement state, namely, the double motor drive mode. Then, in this state, when the clutch C1 of the transmission 60 is placed in a released state and only the motor MG1 is caused to output power, the power output from the motor MG1 can be transmitted to the drive shaft 67 through the second speed gear train or the fourth speed gear train of the transmission 60. As a result, according to the hybrid vehicle 20 of the present embodiment, even in the motor drive mode, the transmission 60 can be used to change the rotation speed of the carrier shaft 45*a* and the first motor shaft 46 to increase torque. Therefore, the maximum torque required for the motors MG1 and MG2 can be decreased, thereby allowing the motors MG1 and MG2 to be made compact. Moreover, in such a motor drive mode, before the speed ratio of the transmission 60 is changed, the simultaneous engagement state of the transmission 60, namely, the double motor drive mode is performed. Therefore, a so-called torque loss does not occur at the time of change in speed ratio, and thus, the speed ratio can be changed very smoothly and without a shock. It should be noted that when a required driving force is increased or the state of charge (SOC) of the battery 35 is decreased in these motor drive modes, one of the motors MG1 and MG2, whichever does not output power according to the speed ratio of the transmission 60, is used to perform cranking of the engine 22, thereby starting the engine 22.

Figure 12:
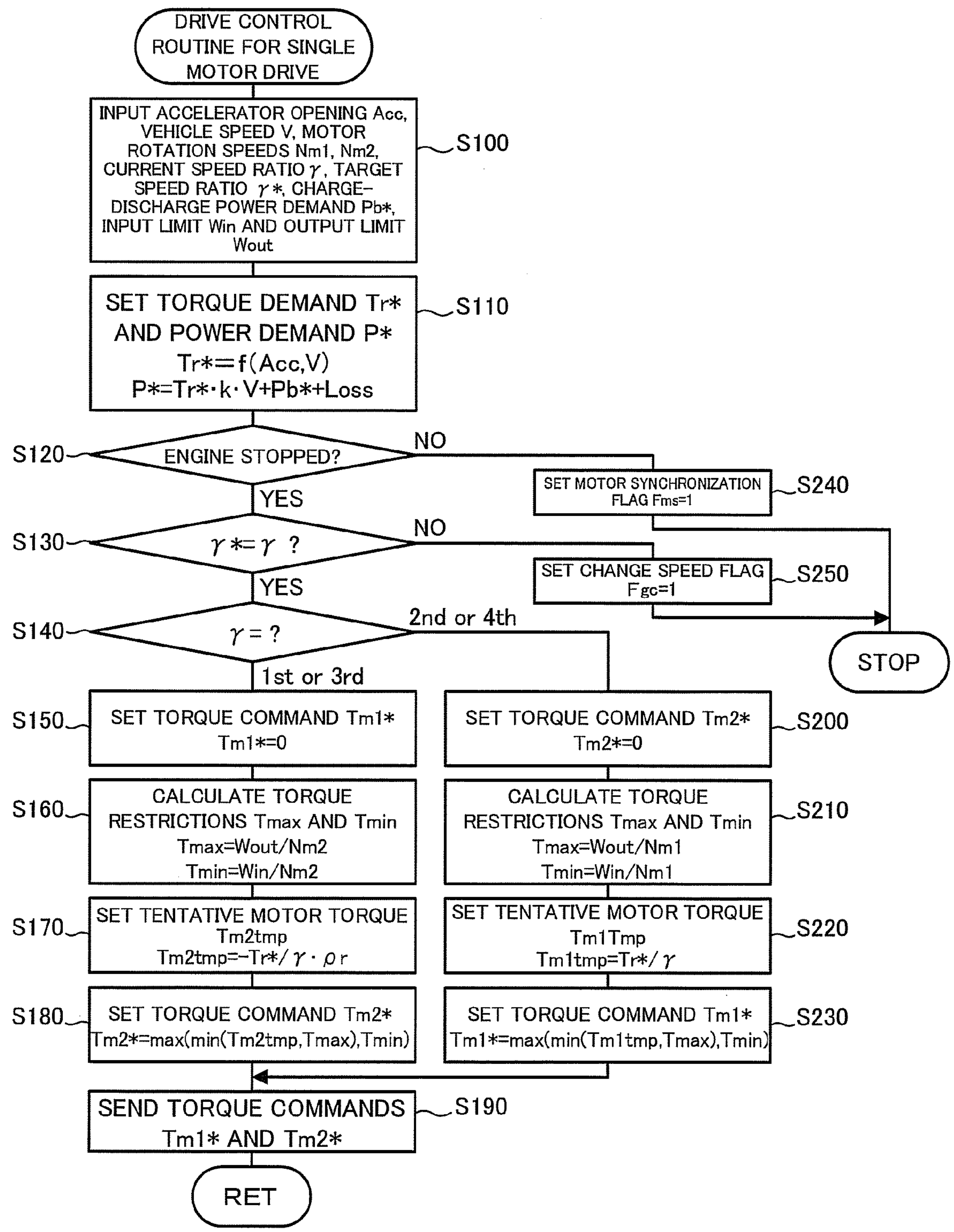
FIG. 12 is a flowchart showing an example of a drive control routine for single motor drive executed by a hybrid ECU 70 when a clutch release single motor drive mode is selected for the hybrid vehicle 20 of the present embodiment.

Subsequently, with reference to FIGS. 12 to 15, a detailed description will be given to a procedure for controlling the hybrid vehicle 20 running in the clutch release single motor drive mode in which the clutch C0 is placed in a released state so as to cause one of the motors MG1 and MG2 to output power. FIG. 12 is a flowchart showing an example of a drive control routine for single motor drive executed by a hybrid ECU 70 when a clutch release single motor drive mode is selected. This routine is executed every predetermined time (e.g., every several msec).

When the drive control routine for single motor drive of FIG. 12 starts, the CPU 72 of the hybrid ECU 70 executes an input process of data required for control such as an accelerator opening Acc from an accelerator pedal position sensor 84; a vehicle speed V from a vehicle speed sensor 87; rotation speeds Nm1 and Nm2 of the motors MG1 and MG2; a current speed ratio γ which is a current speed ratio of the transmission 60 and a target speed ratio γ*; a charge-discharge power demand pb*; and an input limit Win and an output limit Wout of the battery 35 (Step S100). Here, the rotation speeds Nm1 and Nm2 of the motors MG1 and MG2 are assumed to be input from the motor ECU 40 through communication. In addition, the current speed ratio γ of the transmission 60 is a value stored in a predetermined area of the RAM 76 when the speed change of the transmission 60 is completed; the target speed ratio γ* is passed through a transmission process routine (not shown) and is set according to the vehicle speed V, the torque demand, and the like, and is stored in a predetermined area of the RAM 76. Further, the charge/discharge power demand Pb* is assumed to be electric power which is input from the battery ECU 36 through communication, namely, the electric power which is set as electric power to be charged or discharged from the battery 35 by the battery ECU 36 based on the state of charge (SOC) of the battery 35 and the like. Moreover, the input limit Win as a charge allowable power which is electric power allowable to charge the battery 35 and the output limit Wout as a discharge allowable power which is electric power allowable to discharge the same are assumed to be input from the battery ECU 36 through communication, namely, the electric power which is set as the electric power based on the battery temperature Tb of the battery 35 detected by the temperature sensor 37 and the state of charge (SOC) of the battery 35. It should be noted that the input limit Win and the output limit Wout of the battery 35 can be set by setting a basic value of the input limit Win and the output limit Wout based on the battery temperature Tb, setting an output limit correction coefficient and an input limit correction coefficient based on the state of charge (SOC) of the battery 35 and multiplying the set basic values of the input limit Win and the output limit Wout by the correction coefficients.

After the data input process in Step S100, the torque demand Tr* to be output to the drive shaft 67 is set based on the input accelerator opening Acc and the vehicle speed V, and the power demand P* required for the entire hybrid vehicle 20 is set (Step S110). According to the present embodiment, a torque demand setting map (not shown) which preliminarily defines the relationship among the accelerator opening Acc, the vehicle speed V, and the torque demand Tr* is stored in ROM 74. As the torque demand Tr*, a torque demand corresponding to a given accelerator opening Acc and a vehicle speed V is derived and set from the map. Moreover, according to the present embodiment, the power demand P* is calculated by multiplying the torque demand Tr* set in Step S110 by the vehicle speed V indicating the rotation speed of the drive shaft 67 and by a conversion factor k; and adding the product to the charge/discharge power demand Pb* (assuming the charge demanding side as positive) plus a loss (Loss) Subsequently, for example, a determination is made as to whether the engine 22 remains stopped or not based on the power demand P* set in Step S110, the output limit Wout (or the state of charge (SOC)) input in Step S100, and the like (Step S120). If a determination is made that the engine 22 remains stopped in Step S120, further a determination is made as to whether the current speed ratio γ of the transmission 60 matches the target speed ratio γ*, which are both input in Step S100 (Step S130). If the current speed ratio γ matches the target speed ratio γ*, further a determination is made as to which one of the first to fourth speed gear trains matches the current speed ratio γ (Step S140).

If the current speed ratio γ corresponds to the first speed gear train or the third speed gear train, only the motor MG2 should be caused to output power. First, the torque command Tm1* to the motor MG1 is set to a value of 0 (Step S150). Subsequently, each of the input limit Win and the output limit Wout of the battery 35 is divided by the rotation speed Nm2 of the motor MG2 input in Step S100 to calculate the torque restrictions Tmin and Tmax as the upper and lower limits of torque allowed to be output from the motor MG2 (Step S160). Further, the torque demand Tr* set in Step S110, the current speed ratio γ, and the reduction gear ratio ρr of the reduction gear mechanism 50 are used to calculate the tentative motor torque Tm2*tmp* as the torque to be output from the motor MG2 based on the following expression (1) (Step S170). The torque command Tm2* of the motor MG2 is set as a value limiting the tentative motor torque Tm2*tmp* by the torque restrictions Tmin and Tmax calculated in Step S160 (Step S180). Setting the torque command Tm2* of the motor MG2 in this manner allows the torque to be output from the motor MG2 to be set as the torque limited within the input limit Win and the output limit Wout of the battery 35. After the torque commands Tm1* and Tm2* of the motors MG1 and MG2 are set, the set torque commands Tm1* and Tm2* are sent to the motor ECU 40 (Step S190). Then, the processes following Step S100 are executed again. The motor ECU 40 which received the torque commands Tm1* and Tm2* performs switching control on the switching elements of the inverters 31 and 32 so as to allow the motors MG1 and MG2 to be driven according to the torque commands Tm1* and Tm2*.

$$Tm2tmp=-Tr^*/\gamma\cdot\rho r \quad (1)$$

On the contrary, if the current speed ratio γ corresponds to the second speed gear train or the fourth speed gear train, only the motor MG1 is caused to output power. First, the torque command Tm1* to the motor MG2 is set to a value of 0 (Step S200) Next, each of the input limit Win and the output limit Wout of the battery 35 is divided by the rotation speed Nm1 of the motor MG1 input in Step S100 to calculate the torque restrictions Tmin and Tmax as the upper and lower limits of torque allowed to be output from the motor MG1 (Step S210). Further, the torque demand Tr* set in Step S110 and the current speed ratio γ are used to calculate the tentative motor torque Tm1*tmp* as torque to be output from the motor MG1 based on the following expression (2) (Step S220). The torque command Tm1* of the motor MG1 is set as a value limiting the tentative motor torque Tm2*tmp* by the torque restrictions Tmin and Tmax calculated in Step S210 (Step S230). Setting the torque command Tm1* of the motor MG1 in this manner allows the torque to be output from the motor MG1 to be set as the torque limited within the input limit Win and the output limit Wout of the battery 35. After the torque commands Tm1* and Tm2* of the motors MG1 and MG2 are set, the set torque commands Tm1* and Tm2* are sent to the motor ECU 40 (Step S190). Then, the processes following Step S100 are executed again.

$$Tm1tmp=Tr^*/\gamma \quad (2)$$

On the contrary, if a determination is made in Step S120 that the engine 22 should start, one of the motors MG1 and MG2 needs to be placed in a state capable of performing cranking of the engine 22 so as to be able to start the engine 22. However, at this stage, the clutch C0 is in a state of being released, and the motors MG1 and MG2 are substantially in a state of being disconnected from the engine 22. Therefore, in order to start the engine 22, a process of connecting the clutch C0 needs to be executed before starting the engine 22. For this reason, after the process in Step S120, a predetermined motor synchronization flag Fms is set to a value of 1 so as to be able to connect the clutch C0 (Step S240). Then, the present routine is terminated and the execution of a motor synchronization control routine described below is started. Moreover, if a determination is made in Step S130 that the current speed ratio γ does not match the target speed ratio γ*, a change speed flag Fgc is set to a value of 1 (Step S250) so as to instruct the execution of a process of changing the speed ratio (speed state) of the transmission 60 from current speed ratio γ to the target speed ratio γ*. Then, the present routine is terminated and a process of changing the speed ratio based on the aforementioned procedure is executed. It should be noted that the process of changing the speed ratio of the transmission 60 is not directly related to the present invention, and thus the detailed description is omitted here.

Figure 13:
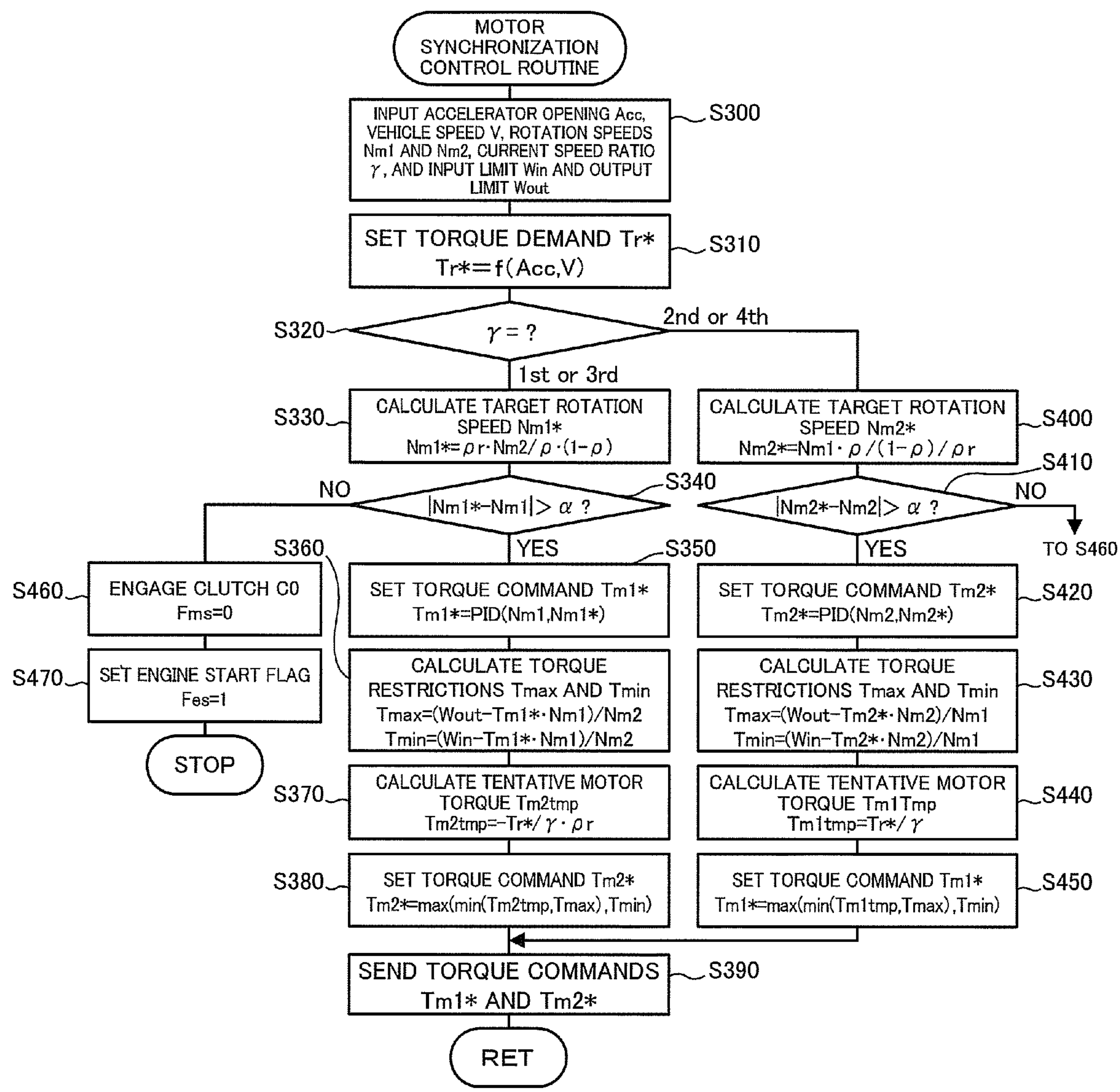
FIG. 13 is a flowchart showing an example of a motor synchronization control routine executed by a hybrid ECU 70 of the present embodiment.

FIG. 13 is a flowchart showing an example of the motor synchronization control routine executed by the hybrid ECU 70. When the motor synchronization flag Fms is set to a value of 1, this routine is executed every predetermined time (e.g., every several msec). When the motor synchronization control routine of FIG. 13 starts, the CPU 72 of the hybrid ECU 70 executes a data input process required for control such as the accelerator opening Acc, the vehicle speed V, the rotation speeds Nm1 and Nm2 of the motors MG1 and MG2, the current speed ratio γ of the transmission 60, and the input limit Win and the output limit Wout of the battery 35 (Step S300). Then, the torque demand Tr* to be output to the drive shaft 67 is set (Step S310). Further, a determination is made as to which one of the first speed gear train to the fourth speed gear train corresponds to the current speed ratio γ (Step S320).

If the current speed ratio γ corresponds to the first speed gear train or the third speed gear train, the carrier shaft 45*a* is coupled to the drive shaft 67 by the transmission 60, and only the motor MG2 outputs power. Since the clutch C0 is released, the rotation speed Nm1 (value 0) of the motor MG1 (first motor shaft 46) is different from the rotation speed of the sun gear 41 of the power distribution and integration mechanism 40 when the clutch C0 is engaged. For this reason, if the current speed ratio γ corresponds to the first speed gear train or the third speed gear train, in order to rotatably synchronize the motor MG1, namely, the first motor shaft 46 with the sun gear 41 of the power distribution and integration mechanism 40, the rotation speed Nm2 of the motor MG2 input in Step S300, the gear ratio ρ of the power distribution and integration mechanism 40, and the reduction gear ratio ρr of the reduction gear mechanism 50 are used to calculate the target rotation speed Nm1* of the motor MG1 based on the following expression (3) (Step S330). The expression (3) is an expression for matching the rotation speed Nm1 of the motor MG1 (second motor) which is released from the coupling to the drive shaft 67, with the rotation speed of the sun gear (second element) 41 at the time of drive source element connection based on the rotation speed Nm2 of the motor MG2 (first motor) coupled to the drive shaft 67, and can be easily derived from the alignment chart of FIG. 9. After the target rotation speed Nm1* of the motor MG1 is obtained, a determination is made as to whether the absolute value of a deviation between the target rotation speed Nm1* and the rotation speed Nm1 of the motor MG1 input in Step S300 is greater than a predetermined value a (Step S340). If the absolute value is greater than the predetermined value α, the calculation of the following expression (4) is executed based on the target rotation speed Nm1* calculated in Step S330 and the rotation speed Nm1 of the motor MG1 to set the torque command Tm1* of the motor MG1 (Step S350). It should be noted that the expression (4) is a relational expression in feedback control for rotating the motor MG1 at the target rotation speed Nm1*; in the expression (4), “k11” of the first term on the right-hand side is a gain of the proportional term; and “k121” of the second term on the right-hand side is a gain of the integral term. Then, a deviation between the input limit Win and the output limit Wout of the battery 35 and the power consumption (generated electric power) of the motor MG1 obtained as a product between the torque command Tm1* of the motor MG1 set in S350 and the current rotation speed Nm1 of the motor MG1 is divided by the rotation speed Nm2 of the motor MG2. By doing so, calculation is made on torque restrictions Tmin and Tmax as the upper and lower limits of the torque allowed to be output from the motor MG2 (Step S360). Further, the tentative motor torque Tm2*tmp* as the torque to be output from the motor MG2 is calculated based on the above expression (1) (Step S370). The torque command Tm2* of the motor MG2 is set as a value limiting the tentative motor torque Tm2*tmp* by the torque restrictions Tmin and Tmax calculated in Step S360 (Step S380). Setting the torque command Tm2* of the motor MG2 in this manner allows the torque to be output from the motor MG2 to be set as the torque limited within the input limit Win and the output limit Wout of the battery 35. After the torque commands Tm1* and Tm2* of the motors MG1 and MG2 are set, the set torque commands Tm1* and Tm2* are sent to the motor ECU 40 (Step S390). Then, the processes following Step S300 are executed again.

$$Nm1^* = \rho r \cdot Nm2 / \rho \cdot (1-\rho) \quad (3)$$

$$Tm1^* = k11(Nm1^* - Nm1) + k12\int(Nm1^* - Nm1)dt \quad (4)$$

On the contrary, if the current speed ratio γ corresponds to the second speed gear train or the fourth speed gear train, the first motor shaft 46 is coupled to the drive shaft 67 by the transmission 60, and only the motor MG1 outputs power. Since the clutch C0 is released, the rotation speed (value 0) of the carrier shaft 45*a* is different from the rotation speed of the carrier 45 of the power distribution and integration mechanism 40 when the clutch C0 is engaged. For this reason, if the current speed ratio γ corresponds to the second speed gear train or the fourth speed gear train, in order to synchronize (correspond to) the rotation speed Nm2 of the motor MG2 with the rotation speed of the carrier 45 which does not correspond to the clutch C0 when the clutch C0 is engaged, the rotation speed Nm1 of the motor MG1 input in Step S300, the gear ratio ρ of the power distribution and integration mechanism 40, and the reduction gear ratio ρr of the reduction gear mechanism 50 are used to calculate the target rotation speed Nm2* of the motor MG2 based on the following expression (5) (Step S400). The expression (5) is an expression for matching the rotation speed Nm2 of the motor MG2 (first motor) which is released from the coupling to the drive shaft 67, with the rotation speed of the carrier (first element) 45 at the time of drive source element connection based on the rotation speed Nm1 of the motor MG1 (second motor) coupled to the drive shaft 67, and can be easily derived from the alignment chart of FIG. 10. After the target rotation speed Nm2* of the motor MG2 is calculated in this manner, a determination is made as to whether the absolute value of a deviation between the target rotation speed Nm2* and the rotation speed Nm2 of the motor MG1 input in Step S300 is greater than a predetermined value a (Step S410). If the absolute value is greater than the predetermined value α, the calculation of the following expression (6) is executed based on the target rotation speed Nm2* calculated in Step S400 and the rotation speed Nm2 of the motor MG2 to set the torque command Tm2* of the motor MG2 (Step S420). It should be noted that the expression (6) is a relational expression in feedback control for rotating the motor MG2 at the target rotation speed Nm2*; in the expression (6), “k21” of the first term on the right-hand side is a gain of the proportional term; and “k22” of the second term on the right-hand side is a gain of the integral term. Then, a deviation between the input limit Win and the output limit Wout of the battery 35 and the power consumption (generated electric power) of the motor MG2 obtained as a product between the torque command Tm2* of the motor MG2 set in S420 and the current rotation speed Nm2 of the motor MG2 is divided by the rotation speed Nm1 of the motor MG1. By doing so, calculation is made on the torque restrictions Tmin and Tmax as the upper and lower limits of the torque allowed to be output from the motor MG1 (Step S430). Further, the tentative motor torque Tm1*tmp* as the torque to be output from the motor MG1 is calculated by the above expression (2) (Step S440). The torque command Tm1* of the motor MG1 is set as a value limiting the tentative motor torque Tm2*tmp* by the torque restrictions Tmin and Tmax calculated in Step S430 (Step S450). After the torque commands Tm1* and Tm2* of the motors MG1 and MG2 are set in this manner, the set torque commands Tm1* and Tm2* are sent to the motor ECU 40 (Step S390). Then, the processes following Step S300 are executed again.

$$Nm2^*=Nm1\cdot\rho/(1-\rho)/\rho r \quad (5)$$

$$Tm2^*=k21(Nm2^*-Nm2)+k22\int(Nm2^*-Nm2)dt \quad (6)$$

Figure 14:
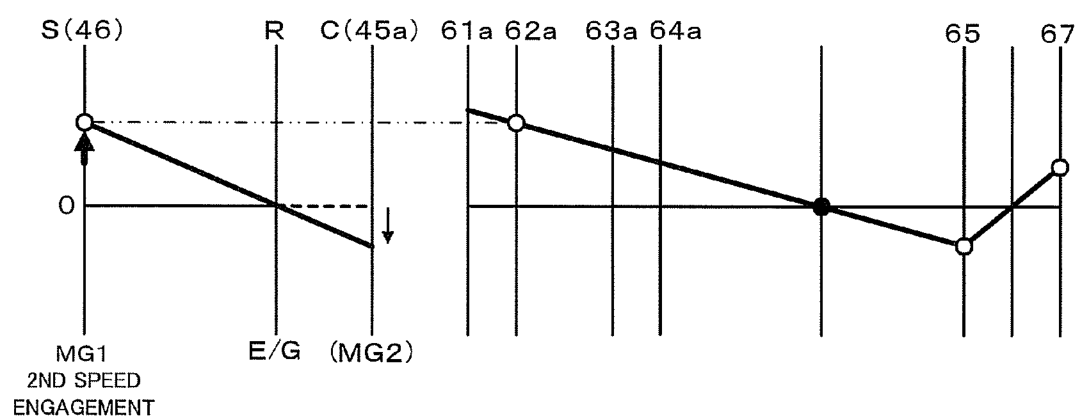
FIG. 14 is an explanatory drawing for explaining an operation while a motor synchronization control routine is being executed.

As described above, the present routine is a process of matching the rotation speed Nm1 or Nm2 of the motor MG1 or MG2 which is released from the coupling to the drive shaft 67, with the rotation speed of the sun gear 41 or the carrier 45 at the time of drive source element connection based on the rotation speed Nm2 or Nm1 of the motor MG2 or MG1 which is coupled to the drive shaft 67 (see FIG. 14). When the above described processes are repeatedly executed, the rotation speed Nm1 or Nm2 of one of the motors MG1 and MG2 substantially matches the target rotation speed Nm1* or Nm2*, and thus a negative determination is made in Step S340 or S410. At a stage in which a negative determination is made in Step S340 or S410, the rotation speed Nm1 of the motor MG1 and the rotation speed Nm2 of the motor MG2 indicate a relationship when the clutch C0 is engaged (see FIG. 14). Therefore, the actuator 88 is drive-controlled so as to connect the sun gear 41 of the power distribution and integration mechanism 40 to the first motor shaft 46 by the clutch C0, and the motor synchronization flag Fms is set to a value of 0 (Step S460). Then, in order to start the engine 22 by cranking thereof by one of the motors MG1 and MG2, the engine start flag Fes is set to a value of 1 (Step S470). Then, the present routine is terminated, and the execution of an engine start time drive control routine described later is started.

Figure 15:
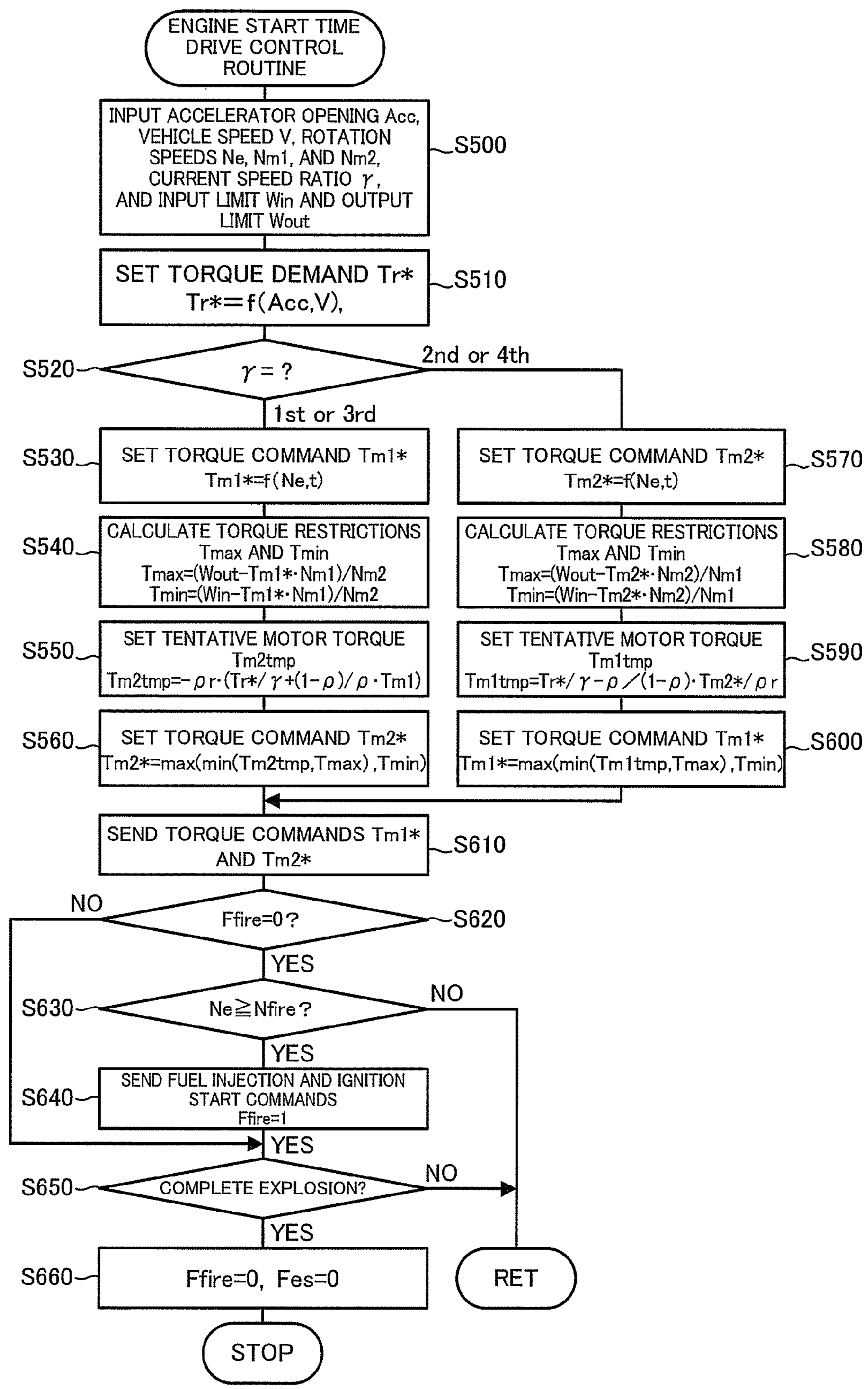
FIG. 15 is a flowchart showing an example of an engine start time drive control routine executed by a hybrid ECU 70 of the present embodiment.

FIG. 15 is a flowchart showing an example of the engine start time drive control routine executed by the hybrid ECU 70. When the engine start flag Fes is set to a value of 1, this routine is executed every predetermined time (e.g., every several msec). When the engine start time drive control routine of FIG. 15 starts, the CPU 72 of the hybrid ECU 70 executes a data input process required for control such as the accelerator opening Acc, the vehicle speed V, the rotation speed Ne of the engine 22 (crankshaft 26), the rotation speeds Nm1 and Nm2 of the motors MG1 and MG2, the current speed ratio γ of the transmission 60, and the input limit Win and the output limit Wout of the battery 35 (Step S500). Here, the rotation speed Ne of the engine 22 is assumed such that a value calculated based on a signal from a crank position sensor (not shown) attached to the crankshaft 26 is input from the engine ECU 24 through communication. After the data input process in Step S500, the torque demand Tr* is set based on the input accelerator opening Acc and the vehicle speed V (Step S510). Further, a determination is made as to which one of the first speed gear train to the fourth speed gear train corresponds to the current speed ratio γ (Step S520).

If the current speed ratio γ corresponds to the first speed gear train or the third speed gear train, which means the carrier shaft 45*a* is coupled to the drive shaft 67 by the transmission 60, the motor MG1 is used to crank the engine 22. Therefore, a predetermined cranking torque setting map (not shown) is used to set the torque command Tm1* of the motor MG1 as cranking torque for cranking the engine 22 according to the rotation speed Ne of the engine 22 input in Step S500 and the elapsed time t since the present routine started (Step S530). Moreover, if the current speed ratio γ corresponds to the second speed gear train or the fourth speed gear train, which means the first motor shaft 46 is coupled to the drive shaft 67 by the transmission 60, the motor MG2 is used to crank the engine 22. Therefore, the above cranking torque setting map is used to set the torque command Tm2* of the motor MG2 as cranking torque for cranking the engine 22 according to the rotation speed Ne of the engine 22 input in Step S500 and the elapsed time t since the present routine started (Step S570). The cranking torque setting map used in Steps S530 and S570 specifies the relationship among the torque commands Tm1* and Tm2* of the motors MG1 and MG2, the rotation speed Ne of the engine 22, and the elapsed time t since the start thereof when the engine 22 starts by cranking. According to the present embodiment, the cranking torque setting map is preliminarily created so as to set relatively large torque as the torque commands Tm1* and Tm2* using a rate process to rapidly increase the rotation speed Ne of the engine 22 immediately after the present routine started, as well as so as to set the torque capable of stably motoring the engine 22 at a predetermined rotation speed or more as the torque commands Tm1* and Tm2* after the rotation speed Ne of the engine 22 passed the resonance rotation speed region or the time required to pass the resonance rotation speed region elapsed, further so as to reduce the torque commands Tm1* and Tm2* up to a value of 0 using the rate process after the rotation speed Ne of the engine 22 reached the predetermined rotation speed. If such a cranking torque setting map is used, vibration which can occur when the engine 22 starts can be well suppressed.

After the torque command Tm1* of the motor MG1 is set in Step S530, in the same manner as in Step S360 of FIG. 13, the torque restrictions Tmax and Tmin are calculated as the upper and lower limits of torque allowed to be output from the motor MG2 (Step S540). Further, the torque demand Tr*, the torque command Tm1*, the gear ratio ρ of the power distribution and integration mechanism 40, the reduction gear ratio ρr of the reduction gear mechanism 50 are used to calculate the tentative motor torque Tm2*tmp* as the torque to be output from the motor MG2 based on the expression (7) (Step S550). It should be noted that the expression (7) can be easily derived from the alignment chart of FIG. 9. Then, the torque command Tm2* of the motor MG2 is set by limiting the calculated tentative motor torque Tm2*tmp* with the torque restrictions Tmax and Tmin calculated in Step S540 (Step S560). Moreover, after the torque command Tm2* of the motor MG2 is set in Step S570, in the same manner as in Step S430 of FIG. 13, the torque restrictions Tmax and Tmin are calculated as the upper and lower limits of the torque allowed to be output from the motor MG1 (Step S580). Further, the torque demand Tr*, the torque command Tm2*, the gear ratio ρ of the power distribution and integration mechanism 40, and the reduction gear ratio ρr of the reduction gear mechanism 50 are used to calculate the tentative motor torque Tm1*tmp* as the torque to be output from the motor MG1 based on the expression (8) (Step S590). It should be noted that the expression (8) can be easily derived from the alignment chart of FIG. 10. Then, the torque command Tm1* of the motor MG1 is set by limiting the calculated tentative motor torque Tm1*tmp* with the torque restrictions Tmax and Tmin calculated in Step S580 (Step S600).

$$Tm2tmp=-\rho r\cdot(Tr^*/\gamma+(1-\rho)/\rho\cdot Tm1) \quad (7)$$

$$Tm1tmp=Tr^*/\gamma-\rho/(1-\rho)\cdot Tm2^*/\rho r \quad (8)$$

After the torque commands Tm1* and Tm2* are set as described above, the set torque commands Tm1* and Tm2* are sent to the motor ECU 40 (Step S610). Then, a determination is made as to whether the fuel injection start flag Ffire is set to a value of 0 or not (Step S620). It should be noted that the flag Ffire is set to a value of 0 before the fuel injection control or the ignition control for the engine 22 starts; and the flag Ffire is set to a value of 1 when the fuel injection control or the ignition control starts. If the fuel injection start flag Ffire is set to a value of 0, further, a determination is made as to whether the rotation speed Ne of the engine 22 reaches the threshold Nfire (Step S630). The threshold Nfire indicates a rotation speed of the engine 22 when the fuel injection control or the ignition control of the engine 22 starts, for example, a value of 1000 to 1200 rpm. If the rotation speed Ne of the engine 22 does not reach the threshold Nfire, the processes following the above Step S500 are executed again. If the rotation speed Ne of the engine 22 reaches the threshold Nfire, the commands to start the fuel injection control and the ignition control are sent to the engine ECU 24, and the fuel injection start flag Ffire is set a value of 1 (Step S640). Then, a determination is made as to whether the engine 22 has reached its complete explosion (Step S650). If the engine 22 has not reached its complete explosion, the processes following Step S500 are executed again. It should be noted that if the fuel injection start flag Ffire is set to a value of 1 in Step S640, a determination is made in Step S620 that the fuel injection start flag Ffire is set to a value of 1, the processes in Step S630 and S640 are skipped, and a determination is made as to whether the engine 22 has reached its complete explosion (Step S650). If the engine 22 has reached its complete explosion, the fuel injection start flag Ffire and the engine start flag Fes are set to a value of 0 respectively (Step S660), and then, the present routine is terminated. When the engine 22 is started in this manner, the hybrid ECU 70 starts executing a drive control routine for driving the hybrid vehicle 20 with an operation of the engine 22.

As described above, according to the hybrid vehicle 20 of the present embodiment, if the drive source element connection, which is a connection between the sun gear 41 which is a second element of the power distribution and integration mechanism 40 and the first rotating shaft of the motor MG1 as the second motor by the clutch C0, is released, the connection between the motor MG1 and the motor MG2 through the power distribution and integration mechanism 40 is released. Therefore, when the clutch release single motor drive mode is selected, the above drive source element connection is released, as well as in an engine 22 stopped state, one of the motor MG1 corresponding to the clutch C0, namely, the first motor shaft 46 and the carrier 45 (carrier shaft 45*a*) which is a first element of the power distribution and integration mechanism 40 and which does not correspond to the clutch C0 is coupled to the drive shaft 67 by the transmission 60, and the power from one of the motors MG1 and MG2 is transmitted to the drive shaft 67, the power based on the torque demand Tr* can be efficiently transmitted to the drive shaft 67 by causing the transmission 60 to change the speed of the power from one of the motors MG1 and MG2 while preventing the engine 22 and the other one of the motors MG1 and MG2 from corotating. Alternatively, when the double motor drive mode is selected, the drive source element connection by the clutch C0 is released, as well as in an engine 22 stopped state, both the motor MG1 corresponding to the clutch C0, namely, the first motor shaft 46 and the carrier 45 (carrier shaft 45*a*) which does not correspond to the clutch C0 are coupled to the drive shaft 67 by the transmission 60, the power output from at least one of the motors MG1 and MG2 can be transmitted to the drive shaft 67 at a predetermined fixed speed ratio while preventing the engine 22 from corotating. Therefore, larger power can be output to the drive shaft 67 in comparison with the mode in which only one of the motors MG1 and MG2 is caused to output power. Further, according to the hybrid vehicle 20, if the clutch engagement single motor drive mode is selected, the power from one of the motors MG1 and MG2 can be transmitted to the drive shaft 67 by causing the transmission 60 to change the speed thereof with the above drive source element connection maintained. Thereby, according to the hybrid vehicle 20, in a plurality of drive modes, the power based on the torque demand Tr* can be efficiently transmitted to the drive shaft 67 by causing the transmission 60 to change the speed of the power output from at least one of the motors MG1 and MG2. It should be noted that in the clutch engagement single motor drive mode, when the power from one of the motors MG1 and MG2 is transmitted to the drive shaft 67 with the above drive source element connection maintained, the engine 22 is prevented from corotating; and in this state, if the engine 22 is cranked by the other one of the motors MG1 and MG2 which does not output power, the engine 22 can be quickly started. As described above, according to the hybrid vehicle 20, in a plurality of drive modes, the power based on the torque demand Tr* can be efficiently transmitted to the drive shaft 67 by causing the transmission 60 to change the speed of the power output from at least one of the motors MG1 and MG2, thereby well improving fuel consumption and drive performance.

Moreover, according to the hybrid vehicle 20 of the present embodiment, when the drive control routine for single motor drive of FIG. 12 is executed, namely, when in a state in which the drive source element connection by the clutch C0 is released, the engine 22 is stopped, and only one of the motors MG1 and MG2 is coupled to the drive shaft 67 by the transmission 60, as well as one of the motors MG1 and MG2 is caused to output power, if a determination is made in Step S120 of FIG. 12 that an engine start condition is established, the motor synchronization control routine (FIG. 13) is executed as a rotation speed adjustment process of adjusting the rotation speed Nm1 or Nm2 of the other one of the motors MG1 and MG2 which does not correspond to the current speed ratio γ and is not coupled to the drive shaft 67 so as to enable the drive source element connection while the power based on the torque demand Tr* can be output to the drive shaft 67. Then, the actuator 88 is drive-controlled so as to connect the sun gear 41 of the power distribution and integration mechanism 40 to the first motor shaft 46 by the clutch C0 (Step S460 of FIG. 13). Then, in a state of such a drive source element connection, when the engine start time drive control routine of FIG. 15 is executed, the engine 22 can be started by cranking the engine 22 by one of the motors MG1 and MG2 while the power based on the torque demand Tr* can be output to the drive shaft 67. As described above, while the hybrid vehicle 20 is running in the clutch release single motor drive mode, if the engine start condition is established, the drive source element connection can be executed by executing the motor synchronization control routine of FIG. 13. Then, if the drive source element connection is executed by the clutch C0, the engine 22 can be started while the power based on the torque demand Tr* is appropriately output to the drive shaft 67.

Further, the transmission 60 of the present embodiment is a parallel shaft-type transmission which includes: a first transmission mechanism having the first speed gear train and the third speed gear train which are parallel shaft-type gear trains capable of coupling the carrier 45 which is a first element of the power distribution and integration mechanism 40 which does not correspond to the clutch C0, to the drive shaft 67; and a second transmission mechanism having the second speed gear train and the fourth speed gear train which are parallel shaft-type gear trains capable of coupling the first motor shaft 46 of the motor MG1 corresponding to the clutch C0, to the drive shaft 67. Therefore, such a transmission 60 can selectively couple, to the drive shaft 67, one of or both of the first motor shaft 46 of the motor MG1 corresponding to the clutch C0 and the carrier 45 (carrier shaft 45*a*) not corresponding to the clutch C0. It should be noted that according to the hybrid vehicle 20 of the present embodiment, a planetary gear transmission may be adopted instead of the parallel shaft-type transmission 60.

Figure 16:
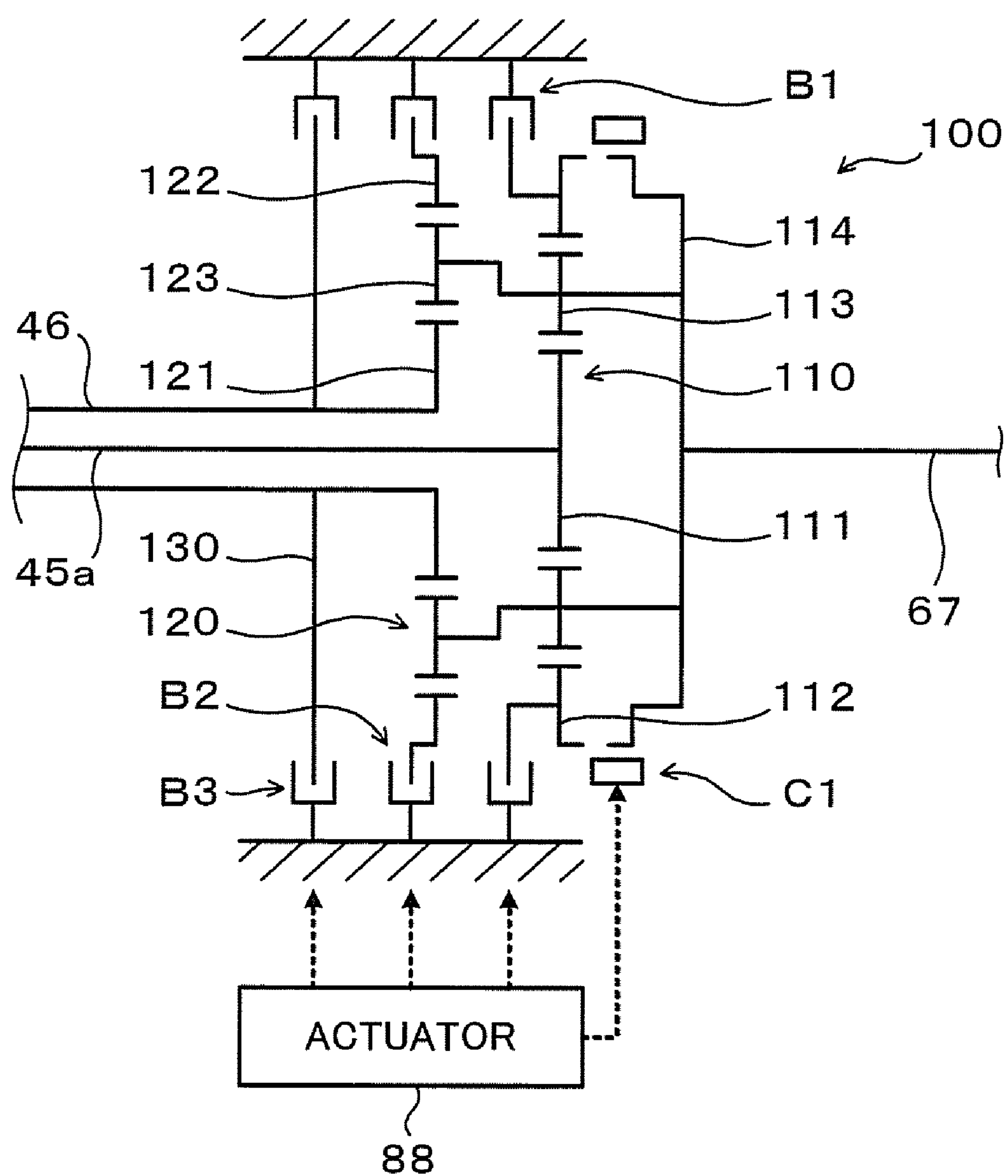
FIG. 16 is a schematic configuration view showing another transmission 100 which can be applied to the hybrid vehicle 20 of the present embodiment.

FIG. 16 is a schematic configuration view of a planetary gear-type transmission 100 applicable to the hybrid vehicle 20 of the present embodiment. The transmission 100 shown in the same Figure can also set the speed ratio (speed state) at a plurality of stages; and includes: a first transmission planetary gear mechanism 110 capable of coupling, to the drive shaft 67, the carrier 45 (carrier shaft 45*a*) which is a first element of the power distribution and integration mechanism 40 and which does not correspond to the clutch C0; a second transmission planetary gear mechanism 120 capable of coupling, to the drive shaft 67, the first motor shaft 46 of the motor MG1 which corresponds to the clutch C0; a brake B1 (first fixing mechanism) provided to the first transmission planetary gear mechanism 110; a brake B2 (second fixing mechanism) provided to the second transmission planetary gear mechanism 120; a brake B3 (third fixing mechanism); the clutch C1 (transmission connection/disconnection mechanism), and the like. The first transmission planetary gear mechanism 110 and the brake B1 constitute the first transmission mechanism of the transmission 100; and the second transmission planetary gear mechanism 120 and the brake B2 constitute the second transmission mechanism of the transmission 100. As shown in FIG. 16, the first transmission planetary gear mechanism 110 is a single pinion planetary gear mechanism which include: a sun gear 111 connected to the carrier shaft 45*a*; a ring gear 112 which is an internal gear arranged concentrically with this sun gear 111; a carrier 114 having a plurality of pinion gears 113 which are meshed with both the sun gear 111 and the ring gear 112, as well as being connected to the drive shaft 67; and is configured such that the sun gear 111 (input element), the ring gear 112 (fixable element), and the carrier 114 (output element) can be differentially rotated with each other. In addition, the second transmission planetary gear mechanism 120 is a single pinion planetary gear mechanism which includes: a sun gear 121 connected to the first motor shaft 46; a ring gear 122 which is an internal gear arranged concentrically with this sun gear 121; and a carrier 114 common to the first transmission planetary gear mechanism 110 having a plurality of pinion gears 123 which are meshed with both the sun gear 121 and the ring gear 122; and is configured such that the sun gear 121 (input element), the ring gear 122 (fixable element), and the carrier 114 (output element) can be differentially rotated with each other. In the example of FIG. 16, the second transmission planetary gear mechanism 120 is arranged in parallel so as to be located coaxially and forward in the vehicle with respect to the first transmission planetary gear mechanism 110, and the gear ratio ρ2 (the number of teeth of the sun gear 121/the number of teeth of the ring gear 122) of the second transmission planetary gear mechanism 120 is set so as to be a little larger than the gear ratio (the number of teeth of the sun gear 111/the number of teeth of the ring gear 112) ρ1 of the first transmission planetary gear mechanism 110.

The brake B1 can non-rotatably fix the ring gear 112 of the first transmission planetary gear mechanism 110 with respect to the transmission case and can release the ring gear 112 so as to be rotatable, and can be driven by the above described electric, electromagnetic, or hydraulic actuator 88. In addition, the brake B2 can non-rotatably fix the ring gear 122 of the second transmission planetary gear mechanism 120 with respect to the transmission case and can release the ring gear 122 so as to be rotatable; and can be driven by the actuator 88 in the same manner as for the brake B1. Further, the brake B3 can non-rotatably fix the first motor shaft 46, namely, the sun gear 41 which is a second element of the power distribution and integration mechanism 40 through the stator 130 fixed to the first motor shaft 46 with respect to the transmission case; can release the stator 130 to cause the first motor shaft 46 to be rotatable; and can be driven by the actuator 88 in the same manner as for the brakes B1 and B2. In addition, the clutch C1 can perform a connection and a release of the connection between the carrier 114 which is an output element of first transmission planetary gear mechanism 110 and the ring gear 112 which is a fixable element; and can be driven by the actuator 88 in the same manner as for the brakes B1 to B3. The clutch C1 can be configured as, for example, a dog clutch which can mesh a dog fixed to the carrier 114 with a dog fixed to the ring gear 112 with less loss and can release the mesh therebetween. Then, the power transmitted from the carrier 114 of the transmission 100 to the drive shaft 67 is finally output to the rear wheels 69*a* and 69*b* as the drive wheels through the differential gear 68. The transmission 100 configured as described above can reduce the axial and radial sizes, for example, in comparison with the parallel shaft-type transmission. Moreover, the first transmission planetary gear mechanism 110 and the second transmission planetary gear mechanism 120 can be provided at a downstream side of and coaxially with the engine 22, the motors MG1 and MG2, and the power distribution and integration mechanism 40. Therefore, the use of the transmission 100 can simplify the shaft bearing and can reduce the number of shaft bearings.

Moreover, the transmission 100 can set the speed ratio at a plurality of stages as described below. That is, the brake B1 is used to non-rotatably fix the ring gear 112 of the first transmission planetary gear mechanism 110 with respect to the transmission case. By doing so, the power from the carrier shaft 45*a* which does not correspond to the clutch C0 can be changed in speed at a speed ratio (ρ1/(1+ρ1)) based on the gear ratio ρ1 of the first transmission planetary gear mechanism 110 and can be transmitted to the drive shaft 67 (hereinafter, this state is referred to as a "first speed state (1st speed)"). In addition, the brake B2 is used to non-rotatably fix the ring gear 122 of the second transmission planetary gear mechanism 120 with respect to the transmission case. By doing so, the power from the first motor shaft 46 which corresponds to the clutch C0 can be changed in speed at a speed ratio (ρ2/(1+ρ2)) based on the gear ratio ρ2 of the second transmission planetary gear mechanism 120 and can be transmitted to the drive shaft 67 (hereinafter, this state is referred to as a "second speed state (2nd speed)"). Further, the clutch C1 is used to connect the carrier 114 and the ring gear 112 of the first transmission planetary gear mechanism 110. By doing so, the sun gear 111, the ring gear 112, and the carrier 114 constituting the first transmission planetary gear mechanism 110 are substantially locked to rotate integrally. Therefore, the power from the carrier shaft 45*a* which does not correspond to the clutch C0 can be transmitted to the drive shaft 67 at a speed ratio of 1 (hereinafter, this state is referred to as a "third speed state (3rd speed)").

In addition, according to the transmission 100, the ring gear 112 is fixed by the brake B1, and the carrier 45 of the power distribution and integration mechanism 40 which does not correspond to the clutch C0 is coupled to the drive shaft 67 by the first transmission planetary gear mechanism 110 (first transmission mechanism). In such a first speed state, when the ring gear 122 is fixed by the brake B2 constituting the second transmission mechanism, the first motor shaft 46 which corresponds to the clutch C0 is also coupled to the drive shaft 67 by the second transmission planetary gear mechanism 120 (second transmission mechanism). Therefore, the power from the engine 22 or the power from at least one of the motors MG1 and MG2 can be mechanically (directly) transmitted to the drive shaft 67 at a fixed speed ratio (this state is referred to as a "1st-2nd speed simultaneous engagement state"). Alternatively, the ring gear 122 of the second transmission planetary gear mechanism 120 which does not correspond to the clutch C1 which is a transmission connection/disconnection mechanism is non-rotatably fixed. In such a second speed state, the clutch C1 is used to connect between the carrier 114 which is an output element of the first transmission planetary gear mechanism 110 which corresponds to the clutch C1 and the ring gear 112 which is a fixable element thereof. Even by doing so, both the first motor shaft 46 which corresponds to the clutch C0 and the carrier 45 which does not correspond to the clutch C0 can be coupled to the drive shaft 67. Therefore, the power from the engine 22 or the power from at least one of the motors MG1 and MG2 can be mechanically (directly) transmitted to the drive shaft 67 at a fixed speed ratio different from the above 1st-2nd speed simultaneous engagement state (this state is referred to as a "2nd-3rd speed simultaneous engagement state"). Further, the clutch C1 is used to connect the carrier 114 and the ring gear 112 of the first transmission planetary gear mechanism 110. In such a third speed state, the brake B3 is used to non-rotatably fix the first motor shaft 46, namely, the sun gear 41 which is a second element of the power distribution and integration mechanism 40 to the transmission case through the stator 130 fixed to the first motor shaft 46. By doing so, the power from the engine 22 and the motor MG2 can be mechanically (directly) transmitted to the drive shaft 67 at a fixed speed ratio different from that of the above 1st-2nd speed simultaneous engagement state and the 2nd-3rd speed simultaneous engagement state (this state is referred to as a "3rd speed fixed state"). Alternatively, the ring gear 112 is fixed by the brake B1 and the carrier 45 of the power distribution and integration mechanism 40 is coupled to the drive shaft 67 by the first transmission planetary gear mechanism 110. In such a first speed state, the brake B3 is used to non-rotatably fix the first motor shaft 46, namely, the sun gear 41 which is a second element of the power distribution and integration mechanism 40 with respect to the transmission case through the stator 130 fixed to the first motor shaft 46. By doing so, the power from the engine 22 and the motor MG2 can be mechanically (directly) transmitted to the drive shaft 67 at a fixed speed ratio different from that of the above 1st-2nd speed simultaneous engagement state, the 2nd-3rd speed simultaneous engagement state, and the 3rd speed fixed state (this state is referred to as a "1st speed fixed state"). As described above, the planetary gear transmission 100 can also provide advantages similar to the parallel shaft-type transmission 60.

Figure 17:
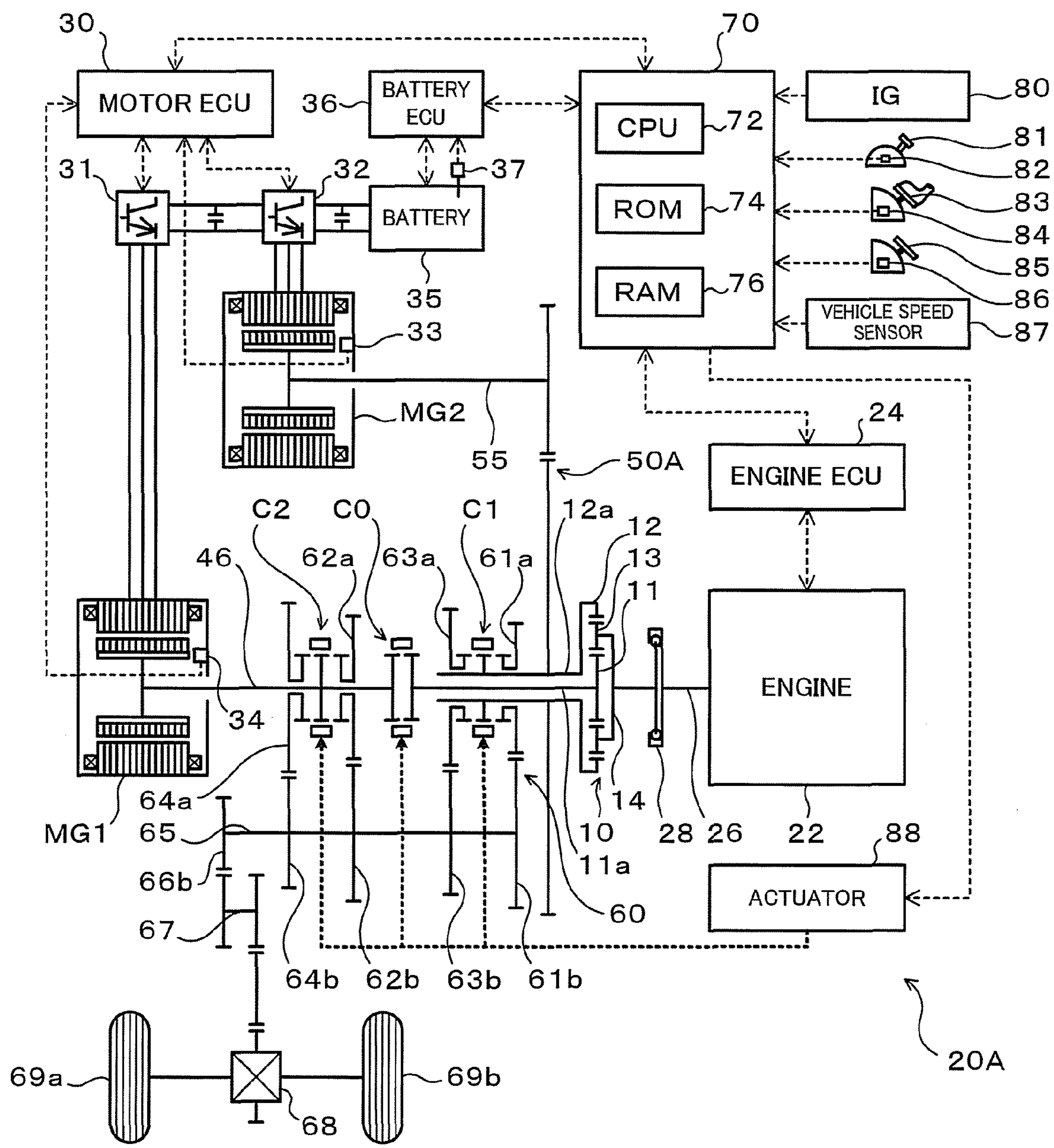
FIG. 17 is a schematic configuration view of a hybrid vehicle 20A which is a variation of the present embodiment.

FIG. 17 is a schematic configuration view of the hybrid vehicle 20A of a variation of the present embodiment. While the above described hybrid vehicle 20 is configured as a rear-wheel-drive vehicle, the hybrid vehicle 20A which is a variation thereof is configured as a front-wheel-drive vehicle. As shown in FIG. 17, the hybrid vehicle 20A has a power distribution and integration mechanism 10 which is a single pinion planetary gear mechanism including the sun gear 11; the ring gear 12 arranged concentrically with the sun gear 11; and the carrier 14 having plurality of pinion gears 13 which are meshed with the sun gear 11 and the ring gear 12. In this case, the engine 22 is arranged transversely, and the crankshaft 26 of the engine 22 is connected to the carrier 14 which is a third element of the power distribution and integration mechanism 10. Moreover, the hollow ring gear shaft 12*a* is connected to the ring gear 12 which is a first element of the power distribution and integration mechanism 10, and the motor MG2 is connected to the ring gear shaft 12*a* through the reduction gear mechanism 50A which is a parallel shaft-type gear train and the second motor shaft 55 which extends in parallel to the first motor shaft 46. Moreover, the clutch C1 can be used to selectively fix one of the first speed gear train (gear 61*a*) and the third speed gear train (gear 63*a*) which constitute the first transmission mechanism of the transmission 60 to the ring gear shaft 12*a*. Further, the sun gear shaft 11*a* is connected to the sun gear 11 which is a second element of the power distribution and integration mechanism 10, the sun gear shaft 11*a* is connected to the clutch C0 through the hollow ring gear shaft 12*a*, and can be connected to the first motor shaft 46, namely, the motor MG1 by the clutch C0. Then, the clutch C2 can be used to selectively fix one of the second speed gear train (gear 62*a*) and the fourth speed gear train (gear 64*a*) constituting the second transmission mechanism of the transmission 60. As described above, the hybrid vehicle in accordance with the present invention may be configured as a front-wheel-drive vehicle.

Hereinbefore, the embodiments of the present invention have been described with reference to drawings, but the present invention is not limited to the above embodiments. It will be apparent that various modifications can be made to the present invention without departing from the spirit and scope of the present invention.

That is, according to the above embodiments, the clutch C0 is provided between the sun gear 41 which is a second element of the power distribution and integration mechanism 40 and the motor MG1 as a second motor and is configured to perform a connection and a release of the connection therebetween, but the clutch C0 may be provided between the carrier 45 which is a first element of the power distribution and integration mechanism 40 and the motor MG2 as a first motor and may be configured to perform a connection and a release of the connection therebetween. Alternatively, the clutch C0 may be provided between the ring gear 42 which is a third element of the power distribution and integration mechanism 40 and the crankshaft 26 of the engine 22 and may be configured to perform a connection and a release of the connection therebetween. Moreover, the power distribution and integration mechanism provided in the above hybrid vehicle 20 may be a planetary gear mechanism which includes a first sun gear and a second sun gear having a mutually different number of teeth; and a carrier having at least one stepped gear configured by coupling a first pinion gear meshed with the first sun gear and a second pinion gear meshed with the second sun gear. Further, the power distribution and integration mechanism provided in the hybrid vehicle 20 may be a single pinion planetary gear mechanism which includes a sun gear, a ring gear, and a carrier having at least one pinion gear meshed with both the sun gear and the ring gear. Further, the above hybrid vehicles 20 and 20A may be configured as a rear-wheel-drive based or front-wheel-drive based four-wheel-drive vehicle. In addition, in the above embodiments, the power output apparatus has been described as being mounted on the hybrid vehicles 20 and 20A, but the power output apparatus in accordance with the present invention may be mounted on a vehicle other than a car, and a mobile body such as vessel and aircraft, and may also be installed in fixed equipment such as construction equipment.

The invention claimed is:

1. A power output apparatus for outputting power to a drive shaft, said power output apparatus comprising:

an internal combustion engine;

a first motor capable of inputting and outputting power;

a second motor capable of inputting and outputting power;

an accumulator capable of supplying and receiving power to and from each of said first and second motors;

a power distribution and integration mechanism having a first element connected to a rotating shaft of said first motor, a second element connected to a rotating shaft of said second motor, and a third element connected to an engine shaft of said internal combustion engine, said power distribution and integration mechanism being configured so that these three elements can be differentially rotated with respect to each other;

a connection/disconnection device capable of performing a drive source element connection and a release of said drive source element connection which is one of a connection between said first motor and said first element, a connection between said second motor and said second element, and a connection between said internal combustion engine and said third element;

a speed change-transmission assembly capable of selectively coupling one of or both of said rotating shaft of said first motor and said rotating shaft of said second motor to said drive shaft, said speed change-transmission assembly being capable of transmitting power from said first motor and power from said second motor to said drive shaft at predetermined respective speed ratios;

a power demand setting device for setting power demand which is power required for said drive shaft; and a control device for controlling said first motor, said second motor, and said connection/disconnection device so that power based on said set power demand is output to said drive shaft, said control device, when an engine start condition for starting said internal combustion engine is satisfied in a state in which said drive source element connection is released, said internal combustion engine is stopped, only one of said first and second motors is coupled to said drive shaft by said speed change-transmission assembly, and said one of said first and second motors outputs power, controlling said first motor, said second motor, and said connection/disconnection device with a rotation speed adjusting process of adjusting a rotation speed of the other of said first and second motors so as to enable said drive source element connection, said drive source element connection, and an engine start process of cranking said internal combustion engine by said first or second motor.

2. A power output apparatus according to claim 1, wherein said rotation speed adjustment process is a process of matching a rotation speed of the other of said first and second motors which is released from a coupling to said drive shaft, with a rotation speed of said first or second element at said drive source element connection based on a rotation speed of said one of said first and second motors which is coupled to said drive shaft.

3. A power output apparatus according to claim 1, wherein said speed change-transmission assembly is a parallel shaft-type transmission which includes a first transmission mechanism having at least one parallel shaft-type gear train capable of coupling one of said first and second elements of said power distribution and integration mechanism to said drive shaft and a second transmission mechanism having at least one parallel shaft-type gear train capable of coupling said rotating shaft of said first motor or said second motor which corresponds to the other of said first and second elements to said drive shaft.

4. A power output apparatus according to claim 1, wherein said speed change-transmission assembly is a planetary gear transmission which includes: a first transmission planetary gear mechanism having an input element connected to one of said first and second elements of said power distribution and integration mechanism, an output element connected to said drive shaft, and a fixable element, said first transmission planetary gear mechanism being configured so that these three elements can be differentially rotated with respect to each other; a first fixing mechanism capable of non-rotatably fixing said fixable element of said first transmission planetary gear mechanism; a second transmission planetary gear mechanism having an input element connected to said rotating shaft of said first or second motor which corresponds to the other of said first and second elements, and an output element connected to said drive shaft, and a fixable element, said second transmission planetary gear mechanism being configured so that these three elements can be differentially rotated with respect to each other; and a second fixing mechanism capable of non-rotatably fixing said fixable element of said second transmission planetary gear mechanism.

5. A power output apparatus according to claim 4, wherein said speed change-transmission assembly further includes a transmission connection/disconnection mechanism capable of performing a connection and a release of said connection between said output element of one of said first transmission planetary gear mechanism and said second transmission planetary gear mechanism and said fixable element.

6. A hybrid vehicle including drive wheels driven by power from a drive shaft, said hybrid vehicle comprising:

an internal combustion engine;

a first motor capable of inputting and outputting power;

a second motor capable of inputting and outputting power;

an accumulator capable of supplying and receiving power to and from each of said first and second motors;

a power distribution and integration mechanism having a first element connected to a rotating shaft of said first motor, a second element connected to a rotating shaft of said second motor, and a third element connected to an engine shaft of said internal combustion engine, said power distribution and integration mechanism being configured so that these three elements can be differentially rotated with respect to each other;

a connection/disconnection device capable of performing a drive source element connection and a release of said drive source element connection which is one of a connection between said first motor and said first element, a connection between said second motor and said second element, and a connection between said internal combustion engine and said third element;

a speed change-transmission assembly capable of selectively coupling one of or both of said rotating shaft of said first motor and said rotating shaft of said second motor to said drive shaft, said speed change-transmission assembly being capable of transmitting power from said first motor and power from said second motor to said drive shaft at predetermined respective speed ratios;

a power demand setting device for setting power demand which is power required for said drive shaft; and a control device for controlling said first motor, said second motor, and said connection/disconnection device, so that power based on said set power demand is output to said drive shaft, said control device, when an engine start condition for starting said internal combustion engine is satisfied in a state in which said drive source element connection is released, said internal combustion engine is stopped, only one of said first and second motors is coupled to said drive shaft by said speed change-transmission assembly, and said one of said first and second motors outputs power, controlling said first motor, said second motor, and said connection/disconnection device with a rotation speed adjusting process of adjusting a rotation speed of the other of said first and second motors so as to enable said drive source element connection, said drive source element connection, and an engine start process of cranking said internal combustion engine by said first or second motor.

7. A power output apparatus for outputting power to a drive shaft, said power output apparatus comprising:

an internal combustion engine;

a first motor capable of inputting and outputting power;

a second motor capable of inputting and outputting power;

an accumulator capable of supplying and receiving power to and from each of said first and second motors;

a power distribution and integration mechanism having a first element connected to a rotating shaft of said first motor, a second element connected to a rotating shaft of said second motor, and a third element connected to an engine shaft of said internal combustion engine, said power distribution and integration mechanism being configured so that these three elements can be differentially rotated with respect to each other;

a connection/disconnection device disposed between said first motor and said first element or between said second motor and said second element, said connection/disconnection device being capable of performing a connection and a release of said connection between said rotating shaft of said first or second motor and said first or second element; and a speed change-transmission assembly capable of selectively coupling said rotating shaft of said first or second motor corresponding to said connection/disconnection device and said first or second element not corresponding to said connection/disconnection device to said drive shaft, said speed change-transmission assembly being capable of transmitting power from a rotating shaft of said first or second motor and power from said first or second element to said drive shaft at predetermined respective speed ratios.

8. A method of controlling a power output apparatus including a drive shaft; an internal combustion engine; a first motor and a second motor capable of inputting and outputting power respectively; an accumulator capable of supplying and receiving power to and from each of said first and second motors; a power distribution and integration mechanism having a first element connected to a rotating shaft of said first motor, a second element connected to a rotating shaft of said second motor, and a third element connected to an engine shaft of said internal combustion engine and configured so that these three elements can be differentially rotated with respect to each other; a connection/disconnection device capable of performing a drive source element connection and a release of said drive source element connection which is one of a connection between said first motor and said first element, a connection between said second motor and said second element, and a connection between said internal combustion engine and said third element; a speed change-transmission assembly capable of selectively coupling one of or both of said rotating shaft of said first motor and said rotating shaft of said second motor to said drive shaft, said speed change-transmission assembly being capable of transmitting power from said first motor and power from said second motor to said drive shaft at predetermined respective speed ratios; said control method comprising:

(a) adjusting, when an engine start condition for starting said internal combustion engine is satisfied in a state in which said drive source element connection is released, said internal combustion engine is stopped, only one of said first and second motors is coupled to said drive shaft by said speed change-transmission assembly, and said one of said first and second motors outputs power, a rotation speed of the other of said first and second motors so as to enable said drive source element connection;

(b) performing said drive source element connection; and (c) starting said internal combustion engine with cranking by said first or second motor.

9. A method of controlling the power output apparatus according to claim 8, wherein torque commands to said first and second motors are set so that power based on a power demand required for said drive shaft is output during the execution of steps (a) to (c).

10. A method of controlling the power output apparatus according to claim 8, wherein said step (a) matches a rotation speed of the other of said first and second motors which is released from a coupling to said drive shaft, with a rotation speed of said first or second element at said drive source element connection based on a rotation speed of one of said first and second motors which is coupled to said drive shaft.

* * * * *